United States Patent
Nagai et al.

(10) Patent No.: US 7,239,339 B2
(45) Date of Patent: Jul. 3, 2007

(54) POSITION DETECTION APPARATUS, POSITION DETECTION METHOD AND POSITION DETECTION PROGRAM

(75) Inventors: Takaaki Nagai, Saitama-ken (JP);
Shinichi Matsunaga, Saitama-ken (JP);
Yoshiaki Sakagami, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1034 days.

(21) Appl. No.: 09/866,151

(22) Filed: May 26, 2001

(65) Prior Publication Data
US 2001/0055063 A1    Dec. 27, 2001

(30) Foreign Application Priority Data
May 26, 2000  (JP)  ............................. 2000-157299
Apr. 23, 2001  (JP)  ............................. 2001-124943

(51) Int. Cl.
*H04N 7/18* (2006.01)
*G06K 9/00* (2006.01)
*G05D 1/00* (2006.01)

(52) U.S. Cl. ..................... 348/116; 348/139; 382/153

(58) Field of Classification Search .................. 701/28, 701/44, 207; 382/153, 106; 348/135, 139, 348/114, 116, 118
See application file for complete search history.

(56) References Cited

U.S. PATENT DOCUMENTS 5,051,906 A     9/1991  Evans, Jr. et al.
5,525,882 A *   6/1996  Asaka et al. ............ 318/568.16

(Continued)

FOREIGN PATENT DOCUMENTS

EP    0 892 278 A    1/1999

(Continued)

OTHER PUBLICATIONS

Chenavier F et al., Position Estimation for a Mobile Robot Using Vision and Odometry May 12, 1992 pp. 2588-2593.

(Continued)

*Primary Examiner*—Gims Philippe
*Assistant Examiner*—Erick Rekstad
(74) *Attorney, Agent, or Firm*—Carrier, Blackman & Associates, P.C.; William D. Blackman; joseph P. Carrier

(57) ABSTRACT

A position detection apparatus that is able to easily detect self-position during autonomous movement by a humanoid robot that moves by the use of legs or automobile. The position detection apparatus detects the position of a moving object, said position detection apparatus being provided with a brightness image acquisition device that acquires a brightness image of the forward field of view of the moving object, a distance image acquisition device having the same field of view as the brightness image acquisition device that acquires a distance image simultaneous to acquisition of a brightness image by the brightness image acquisition device, a characteristic point extraction device that extracts respective characteristic points from the brightness images of at least two consecutive frames, and a reference characteristic point selection device that calculates the amount of displacement of a position between two frames of a characteristic point extracted by the characteristic point extraction device based on a distance image, and selects a reference characteristic point for calculating self-position according to said amount of displacement.

22 Claims, 13 Drawing Sheets

U.S. PATENT DOCUMENTS 5,777,690 A     7/1998  Takeda et al.
5,819,016 A *  10/1998  Watanabe et al. ........... 345/419
6,148,250 A *  11/2000  Saneyoshi et al. ............. 701/4
6,477,260 B1 * 11/2002  Shimomura ................. 382/106
6,678,394 B1 *  1/2004  Nichani ...................... 382/103

FOREIGN PATENT DOCUMENTS

| | | | |
|---|---|---|---|
| GB | 2 116 000 A | 9/1983 | |
| WO | WO 99/53335 | 10/1999 | |
| WO | WO 99/53335 A | 10/1999 | |

OTHER PUBLICATIONS

Kokichi Sugihara, Some Location Problems for Robot Navigation Using a Single Camers Apr. 1, 1988 pp. 112-129.

* cited by examiner

POSITION DETECTION APPARATUS, POSITION DETECTION METHOD AND POSITION DETECTION PROGRAM

TECHNICAL FIELD

The present invention relates to a position detection apparatus, position detection method and position detection program that detect self-position of a moving object during movement of a robot, automobile or other moving object using a distance image. In particular, the present invention relates to self-position detection by a humanoid robot that moves by the use of legs.

BACKGROUND ART

Vehicle position detection of the prior art involved receiving information emitted from a GPS or beacon, analyzing that information and then detecting the position of the vehicle. Since position detection using a GPS or beacon requires that electromagnetic waves emitted by the GPS or beacon be received, in the case of an object being present that obstructs electromagnetic waves between the electromagnetic device transmission apparatus and the reception apparatus installed in the vehicle, there is the problem of it no longer being possible to detect vehicle position. This type of system cannot be used at all by robots and so forth that move only indoors. Consequently, there are position detection apparatuses that detect the position of a vehicle based on sensor output values, or depending on the case, by matching road map data, by installing a distance sensor and azimuth sensor that detect wheel rotating speed on a vehicle. An example of this technology is described in Japanese Unexamined Patent Application, First Publication No. 9-243389.

However, in addition to it being necessary to provide detailed road map data inside the apparatus, since the detection results of this position detection apparatus contains error in the output values of the distance sensor and azimuth sensor, if position detection according to the output values of the distance sensor and azimuth sensor alone continues for a long period of time, the detection error ends up accumulating resulting in the problem of the detected vehicle position differing greatly from actual vehicle position. In addition, during movement of a humanoid robot that moves by the use of legs indoors in particular, although it is necessary for the robot itself to determine the relative locations of walls and columns, the position detection apparatus of the prior art has the problem of encountering difficulty in autonomous movement since it is difficult to determine relative positional relationships with the surrounding environment.

DISCLOSURE OF THE INVENTION

In consideration of the circumstances as described above, the object of the present invention is to provide a position detection apparatus, position detection method and position detection program that makes it possible to easily detect self-position using images of the surrounding environment during autonomous movement by a humanoid robot that moves by the use of legs or automobile.

The invention according to a first aspect is a position detection apparatus that detects the position of a moving object, said position detection apparatus being provided with an image acquisition device that acquires an image of the forward field of view of said moving object, a distance image acquisition device having the same field of view as said image acquisition device that acquires a distance image simultaneous to acquisition of an image by said image acquisition device, a characteristic point extraction device that extracts respective characteristic points from the images of at least two consecutive frames, and a reference characteristic point selection device that calculates the amount of displacement of a position between two frames of a characteristic point extracted by said characteristic point extraction device based on said distance image, and selects a reference characteristic point for calculating self-position according to said amount of displacement.

According to this aspect of the invention, since the same stationary object is extracted from the images of two consecutive frames as the reference characteristic point, the displacement of this stationary object is determined, and the amount of self-movement is determined from the amount of this displacement, the effect is obtained in which self-position can be detected with high accuracy. In addition, since extraction of the stationary object is performed autonomously, it is not necessary to provide a map and so forth in which the positions of stationary objects are pre-defined, thereby allowing the constitution to be simplified. Moreover, since it is not necessary to provide road map data or other map data, in addition to being able to simplify the constitution, it becomes possible to move to unknown locations, thereby obtaining the effect of being able to eliminate limitations on the range of action of the moving body.

The invention according to a second aspect is a position detection apparatus that detects the position of a moving object, said position detection apparatus being provided with an image acquisition device that acquires an image within the forward field of view of said moving object, a reference point determination device that determines a reference characteristic point to serve as a reference during movement of said moving object based on an image obtained from said image acquisition device, and a position detection device that detects position by substituting self-movement control and the observed amount of said reference point into an extended Kalman filter.

According to this aspect of the invention, since a position detection device is provided that detects self-position by substituting self-movement control and the observed amount of said reference point into an extended Kalman filter, the effect is obtained in which self-position can be detected more accurately.

The invention according to a third aspect is a position detection apparatus that detects the position of a moving object, said position detection apparatus being provided with an image acquisition device that acquires an image of the forward field of view of said moving object, a distance image acquisition device having the same field of view as said image acquisition device that acquires a distance image simultaneous to acquisition of an image by said image acquisition device, a characteristic point extraction device that extracts respective characteristic points from obtained images, and a reference characteristic point selection device that compares pre-stored object information with extracted characteristic points, and considers those characteristic points having a high correlation to be known characteristic points that are used as reference characteristic points for calculating position.

According to this aspect of the invention, since pre-stored object information and extracted characteristic points are compared, and those characteristic points having a high correlation to characteristic points in the pre-stored object information are considered to be known characteristic points that are used as reference characteristic points for calculating position, the effect is obtained in which self-position can be detected more accurately.

In the invention according to a fourth aspect, said characteristic point selection device updates said object information by determining the relative relationship between unknown characteristic points and known characteristic points in an image in which characteristic points considered to be known are present, and storing said unknown characteristic points as known characteristic points.

According to this aspect of the invention, since said object information is updated by determining the relative relationship between unknown characteristic points and known characteristic points in an image in which characteristic points considered to be known are present, and storing said unknown characteristic points as known characteristic points, the effect is obtained in which object information can be updated automatically.

The invention according to a fifth aspect is a position detection apparatus that detects the position of a moving object, said position detection apparatus being provided with an image acquisition device that acquires an image of the forward field of view of said moving object, a characteristic point group extraction device that extracts a characteristic point group in said image, and a position detection device that calculates position by correlating and storing multiple characteristic point groups in an image pre-obtained with said image acquisition device with positions at which said characteristic point groups are obtained, and calculating the correlation between a characteristic point group of a newly obtained image and pre-stored characteristic point groups.

According to this aspect of the invention, since self-position is determined by storing multiple characteristic point groups in an image pre-obtained using said image acquisition device with positions at which said characteristic point groups are obtained, and calculating the correlation between a characteristic point group of a newly obtained image and pre-stored characteristic point groups, the effect is obtained in which, even in cases in which robot position cannot be obtained geometrically, self-position can be detected based on previous results of position detection.

The invention according to a sixth aspect is a position detection method that detects the position of a moving object, said position detection method having an image acquisition process in which an image of the forward field of view of said moving object is acquired, a distance image acquisition process having the same field of view as said image in which a distance image is acquired simultaneous to acquisition of said image, a characteristic point extraction process in which respective characteristic points are acquired from the images of at least two consecutive frames, and a reference characteristic point selection process in which the amount of displacement of a position between two frames of a characteristic point extracted in said characteristic point extraction process is calculated based on said distance image, and a reference characteristic point for calculating position according to said amount of displacement is selected.

According to this aspect of the invention, since the same stationary object is extracted from the images of two consecutive frames as the reference characteristic point, the displacement of this stationary object is determined, and the amount of self-movement is determined from the amount of this displacement, the effect is obtained in which self-position can be detected with high accuracy. In addition, since extraction of the stationary object is performed autonomously, it is not necessary to provide a map and so forth in which the positions of stationary objects are pre-defined, thereby allowing the constitution to be simplified. Moreover, since it is not necessary to provide road map data or other map data, in addition to being able to simplify the constitution, it becomes possible to move to unknown locations, thereby obtaining the effect of being able to eliminate limitations on the range of action of the moving body.

The invention according to a seventh aspect is a position detection method that detects the position of a moving object, said position detection method having an image acquisition process in which an image within the forward field of view of said moving object is acquired, a reference point determination process in which a reference characteristic point to serve as a reference during movement of said moving object is determined based on said image, and a position detection process in which position is detected by substituting self-movement control and the observed amount of said reference point into an extended Kalman filter.

According to this aspect of the invention, since a position detection device is provided that detects self-position by substituting self-movement control and the observed amount of said reference point into an extended Kalman filter, the effect is obtained in which self-position can be detected more accurately.

The invention according to an eighth aspect is a position detection method that detects the position of a moving object, said position detection method having an image acquisition process in which an image of the forward field of view of said moving object is acquired, a distance image acquisition process having the same field of view as said image in which a distance image is acquired simultaneous to acquisition of said image, a characteristic point extraction process in which respective characteristic points are extracted from obtained images, and a reference characteristic point selection process in which pre-stored object information is compared with extracted characteristic points, and those characteristic points having a high correlation are considered to be known characteristic points that are used as reference characteristic points for calculating position.

According to this aspect of the invention, since pre-stored object information and extracted characteristic points are compared, and those characteristic points having a high correlation to characteristic points in the pre-stored object information are considered to be known characteristic points that are used as reference characteristic points for calculating position, the effect is obtained in which self-position can be detected more accurately.

In the invention according to a ninth aspect, the above characteristic point selection process updates said object information by determining the relative relationship between unknown characteristic points and known characteristic points in an image in which characteristic points considered to be known are present, and storing said unknown characteristic points as known characteristic points.

According to this aspect of the invention, since said object information is updated by determining the relative relationship between unknown characteristic points and known characteristic points in an image in which characteristic points considered to be known are present, and storing said unknown characteristic points as known characteristic points, the effect is obtained in which object information can be updated automatically.

The invention according to a tenth aspect is a position detection method that detects the position of a moving object, said position detection method having an image acquisition process in which an image of the forward field of view of said moving object is acquired, a characteristic point group extraction process in which a characteristic point group in said image is extracted, and a position detection process in which position is calculated by correlating and storing multiple characteristic point groups in an image pre-obtained in said image acquisition process with positions at which said characteristic point groups are obtained, and calculating the correlation between a characteristic point group of a newly obtained image and pre-stored characteristic point groups.

According to this aspect of the invention, since self-position is determined by storing multiple characteristic point groups in an image pre-obtained using said image acquisition device with positions at which said characteristic point groups are obtained, and calculating the correlation between a characteristic point group of a newly obtained image and pre-stored characteristic point groups, the effect is obtained in which, even in cases in which robot position cannot be obtained geometrically, self-position can be detected based on previous results of position detection.

The invention according to an eleventh aspect is a position detection program for detecting the position of a moving object, said position detection program comprising performing by computer: image acquisition processing in which an image of the forward field of view of said moving object is acquired, distance image acquisition processing having the same field of view as said image in which a distance image is acquired simultaneous to acquisition of said image, characteristic point extraction processing in which respective characteristic points are acquired from the images of at least two consecutive frames, and reference characteristic point selection processing in which the amount of displacement of a position between two frames of a characteristic point extracted in said characteristic point extraction processing is calculated based on said distance image, and a reference characteristic point for calculating position according to said amount of displacement is selected.

According to this aspect of the invention, since the same stationary object is extracted from the images of two consecutive frames as the reference characteristic point, the displacement of this stationary object is determined, and the amount of self-movement is determined from the amount of this displacement, the effect is obtained in which self-position can be detected with high accuracy. In addition, since extraction of the stationary object is performed autonomously, it is not necessary to provide a map and so forth in which the positions of stationary objects are pre-defined, thereby allowing the constitution to be simplified. Moreover, since it is not necessary to provide road map data or other map data, in addition to being able to simplify the constitution, it becomes possible to move to unknown locations, thereby obtaining the effect of being able to eliminate limitations on the range of action of the moving body.

The invention according to a twelfth aspect is a position detection program for detecting the position of a moving object, said position detection program comprising performing by computer: image acquisition processing in which an image within the forward field of view of said moving object is acquired, reference point determination processing in which a reference characteristic point to serve as a reference during movement of said moving object is determined based on said image, and position detection processing in which position is detected by substituting self-movement control and the observed amount of said reference point into an extended Kalman filter.

According to this aspect of the invention, since a position detection device is provided that detects self-position by substituting self-movement control and the observed amount of said reference point into an extended Kahnan filter, the effect is obtained in which self-position can be detected more accurately.

The invention according to a thirteenth aspect is a position detection program for detecting the position of a moving object, said position detection program comprising performing by computer: image acquisition processing in which an image of the forward field of view of said moving object is acquired, distance image acquisition processing having the same field of view as said image in which a distance image is acquired simultaneous to acquisition of said image, characteristic point extraction processing in which respective characteristic points are extracted from obtained images, and reference characteristic point selection processing in which pre-stored object information is compared with extracted characteristic points, and those characteristic points having a high correlation are considered to be known characteristic points that are used as reference characteristic points for calculating position.

According to this aspect of the invention, since pre-stored object information and extracted characteristic points are compared, and those characteristic points having a high correlation to characteristic points in the pre-stored object information are considered to be known characteristic points that are used as reference characteristic points for calculating position, the effect is obtained in which self-position can be detected more accurately.

In the invention according to a fourteenth aspect, the above characteristic point selection processing updates said object information by determining the relative relationship between unknown characteristic points and known characteristic points in an image in which characteristic points considered to be known are present, and storing said unknown characteristic points as known characteristic points.

According to this aspect of the invention, since said object information is updated by determining the relative relationship between unknown characteristic points and known characteristic points in an image in which characteristic points considered to be known are present, and storing said unknown characteristic points as known characteristic points, the effect is obtained in which object information can be updated automatically.

The invention according to a fifteenth aspect is a position detection program for detecting the position of a moving object, said position detection program comprising performing by computer: image acquisition processing in which an image of the forward field of view of said moving object is acquired, characteristic point group extraction processing in which a characteristic point group in said image is extracted, and position detection processing in which position is calculated by correlating and storing multiple characteristic point groups in an image pre-obtained in said image acquisition processing with positions at which said characteristic point groups are obtained, and calculating the correlation between a characteristic point group of a newly obtained image and pre-stored characteristic point groups.

According to this aspect of the invention, since self-position is determined by storing multiple characteristic point groups in an image pre-obtained using said image acquisition device with positions at which said characteristic point groups are obtained, and calculating the correlation between a characteristic point group of a newly obtained image and pre-stored characteristic point groups, the effect is obtained in which, even in cases in which robot position cannot be obtained geometrically, self-position can be detected based on previous results of position detection.

DETAILED DESCRIPTION OF THE INVENTION

BEST MODE FOR CARRYING OUT THE INVENTION

FIRST EMBODIMENT

Figure 1:
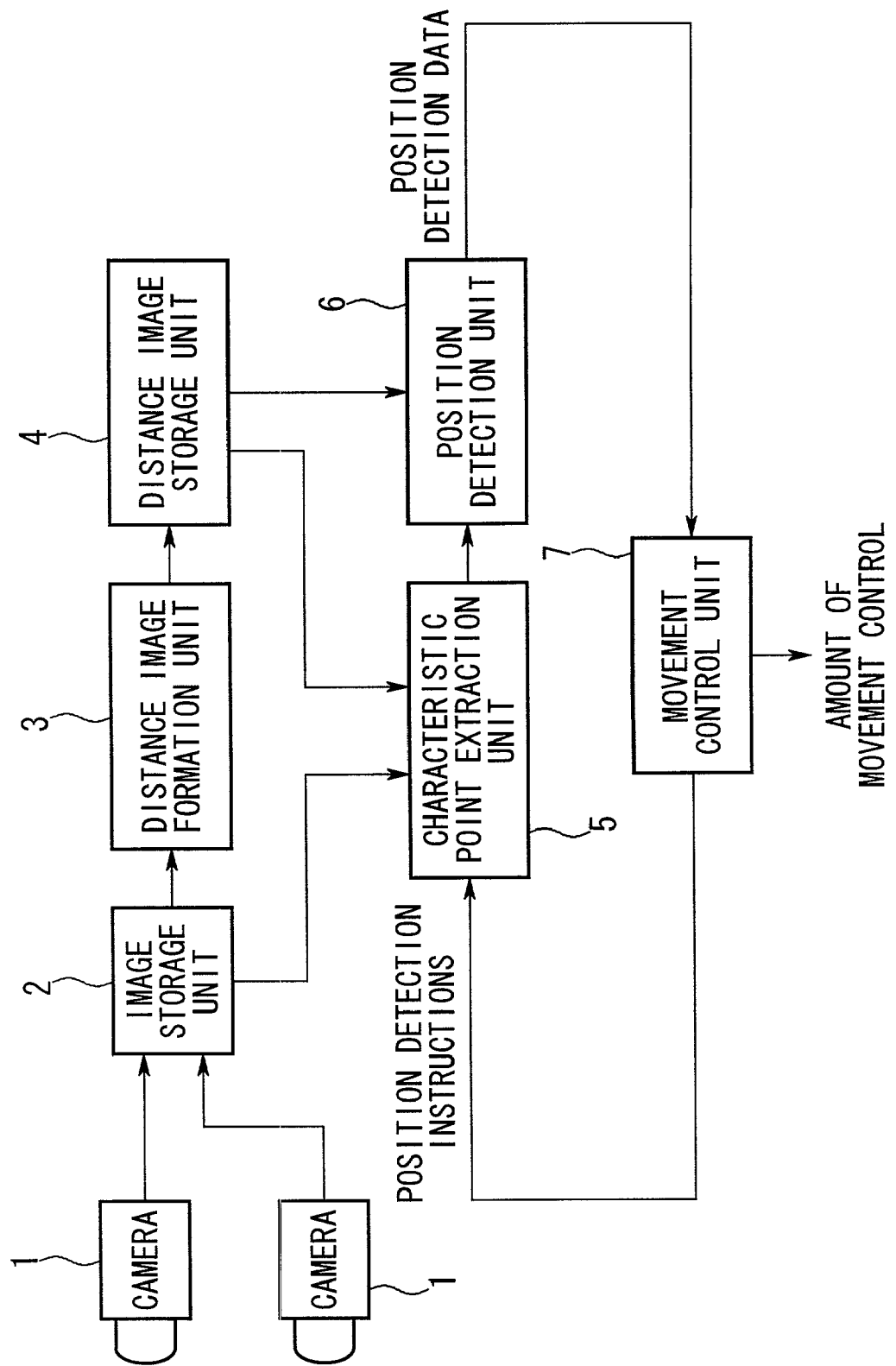
FIG. 1 is a block diagram showing the constitution of a first embodiment of the present invention.

The following provides an explanation of a position detection apparatus according to a first embodiment of the present invention with reference to the drawings. FIG. 1 is a block diagram showing the constitution of the present embodiment. Here, the position detection apparatus shown in FIG. 1 is explained in the form of that equipped on an autonomous travel robot that moves indoors. In this drawing, reference symbol 1 represents two cameras that capture an object present in the field of view in the direction of movement during movement by the robot. These cameras are installed at a prescribed interval, and their mutual fields of view are aligned. Reference symbol 2 represents an image storage unit that respectively stores individual frames of images obtained by cameras 1, and is composed of two frames of image memory. Reference symbol 3 represents a distance image formation unit that forms distance images from two frames of images stored in image storage unit 2. Reference symbol 4 represents a distance image storage unit that stores the distance images formed in distance image formation unit 3. Reference symbol 5 represents a characteristic point extraction unit that extracts characteristic points from images stored in image storage unit 2 or distance image storage unit 4. Reference symbol 6 represents a position detection unit that detects self-position based on the results of characteristic point extraction in characteristic point extraction unit 5. Reference symbol 7 represents a movement control unit that controls the movement of the robot by referring to the results of position detection by position detection unit 6.

Here, the coordinate system used in the following explanation is defined. The forward distance direction when the robot is in the initial state is designated as the X axis, the lateral directions of the robot are designated as the Y axis, the vertical direction is designated as the Z axis, and these three axes are mutually intersecting. In addition, distance as mentioned below refers to the linear distance from cameras 1 to each object. Thus, distance image data is the set of three-dimensional coordinate values of a measurement point on the surface of an object in the field of view of cameras 1.

Figure 2:
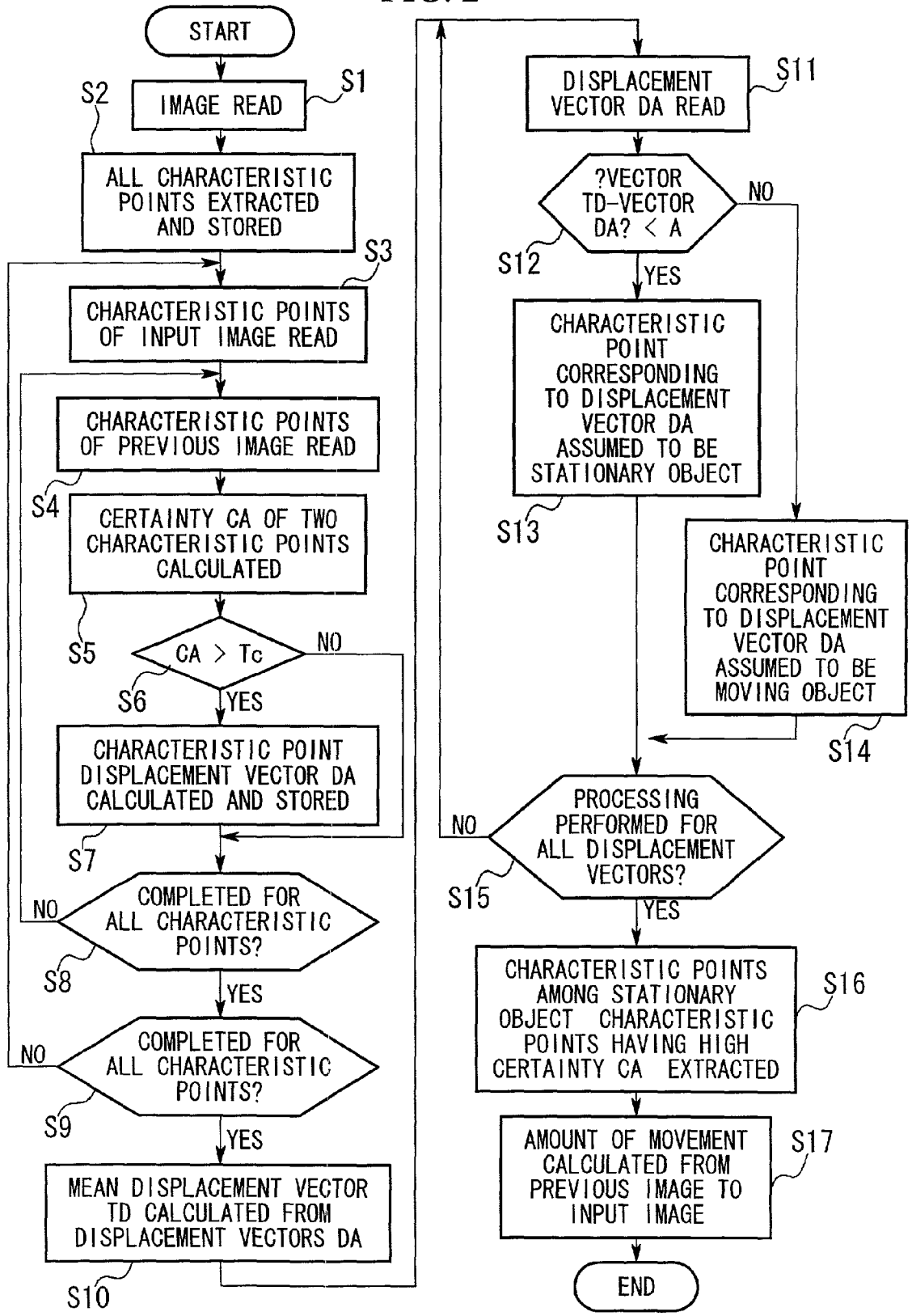
FIG. 2 is a flow chart showing the operations of characteristic point extraction unit 5 and position detection unit 6 shown in FIG. 1.

Next, an explanation is provided of the operation of the position detection apparatus shown in FIG. 1 with reference to the drawings. FIG. 2 is a flow chart showing the operation by which characteristic points are tracked continuously from brightness images stored in image storage unit 2 and distance images stored in distance image storage unit 4 by characteristic point extraction unit 5 and position detection unit 6 to detect self-position based on that position data. Each of the processing shown in the flow chart of FIG. 2 is executed repeatedly each time an image is captured by cameras 1.

To begin with, the two cameras 1 operate as stereo cameras, and brightness images are captured with each camera which are then respectively stored in image storage unit 2. Subsequently, in response to brightness images having been stored in image storage unit 2, distance image formation unit 3 forms a distance image by determining the corresponding points of the pixels of each image from the two brightness images acquired with two cameras 1, which is then stored in distance image storage unit 4. Here, distance images are generated using so-called sub-pixels by interpolating between pixels in order to obtain more precise distance images with fewer pixels. Furthermore, in the example shown here, the brightness and distance images of each pixel are expressed with 256 gradations. Although ordinary image pixels represent the brightness on the surface of an object in the field of view of a sensor, the pixels of distance images represent the distance to the surface of an object in the field of view of a sensor in 256 gradations. Thus, XYZ coordinates can be specified from a camera position to a single point on the surface of an object present in three-dimensional space according to the position of the pixels in a distance image. Furthermore, in cases when more precise distance accuracy is required, accuracy can be improved by using laser radar, milliwave radar or ultrasonic waves in place of the cameras. Moreover, output values from the distance sensor may also be used directly without representing distance data in 256 gradations. Cameras 1 and distance image formation unit 3 execute this operation repeatedly. On the other hand, characteristic point extraction unit 5 reads images stored in image storage unit 2 (Step S1).

Next, characteristic point extraction unit 5 extracts characteristic points from the brightness images that have been read, and stores these characteristic points in characteristic point extraction unit 5 (Step S2). The characteristic points mentioned here refer to points equivalent to an unchanging characteristic amount used in image processing that characterize forms appearing in an image. Extraction of these characteristic points is performed by, for example, performing edge detection processing on brightness images and selecting those points that compose the detected edge. Furthermore, characteristic point extraction unit 5 may read distance images stored in distance image storage unit 4, and then extract characteristic points from these distance images. Characteristic points are created using two consecutively incorporated brightness images. Here, their respective times are designated as "t" and "(t+1)". In addition, during characteristic point extraction, brightness images obtained from either left or right camera 1 are used, and two types of characteristic points are stored consisting of a set of characteristic points extracted from the input image of time (t+1), and a set of characteristic points extracted from the image of time t immediately prior to the input image. Coordinate values on the image are stored for these characteristic points.

Next, position detection unit 6 reads a single input image characteristic point stored in characteristic point extraction unit 5 in order to determine the corresponding point of these characteristic points of two different times (Step S3). Subsequently, position detection unit 6 reads one image point of the previous image stored in characteristic point extraction unit 5 (Step S4). Here, previous time t refers to the time at which Steps S1 through S17 presently being explained were performed previously, and the corresponding point between two different times t and (t+1) is obtained by Steps S1 through S17 being performed two times or more. Accordingly, when Steps S1 through S17 are performed for the first time, the process is extraordinarily executed through Step S3 and then returns to Step S1.

Figure 3:
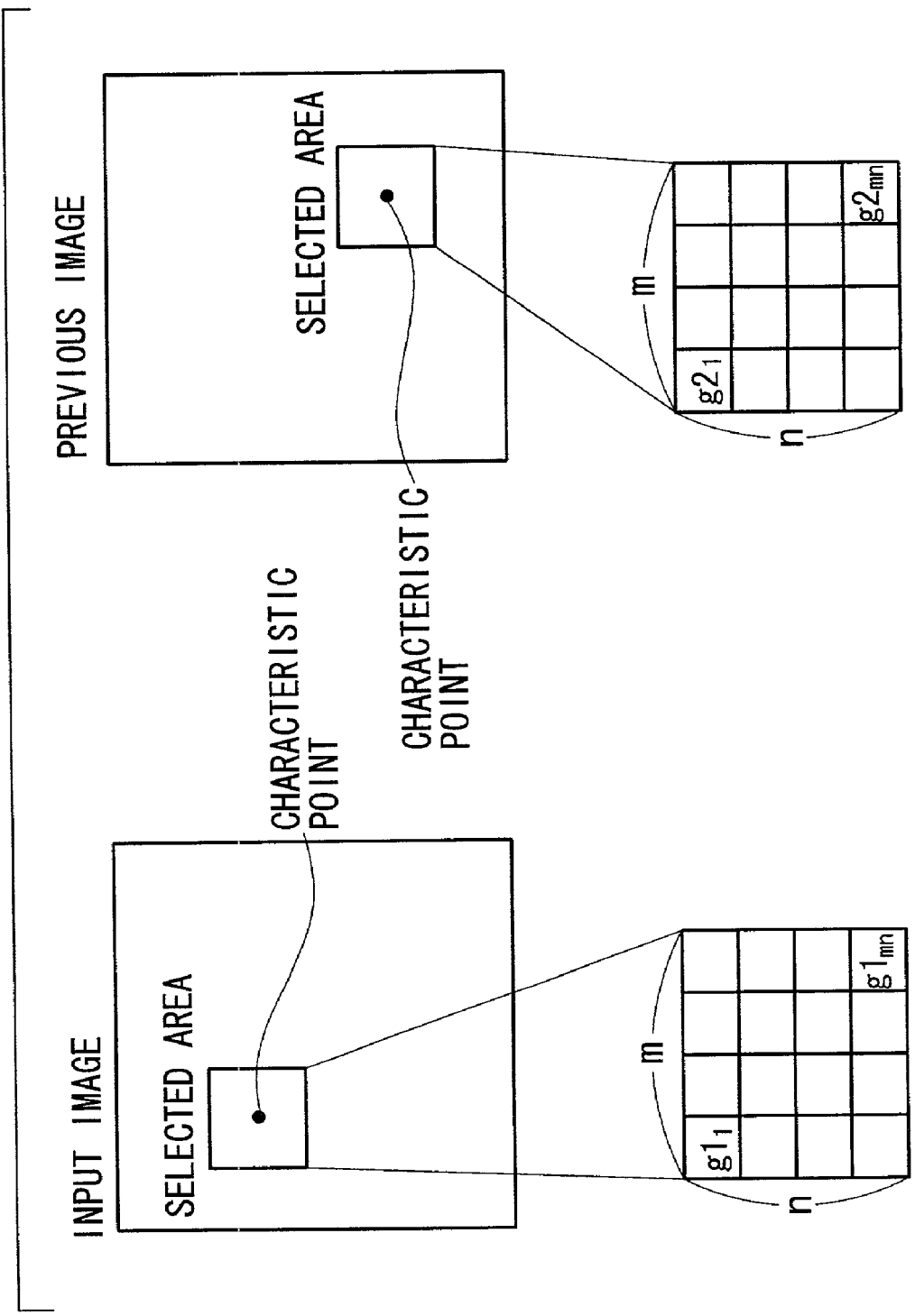
FIG. 3 is an explanatory drawing showing processing for calculating the certainty CA of two characteristic points.

Next, position detection unit 6 calculates the certainty CA of two characteristic points and performs pattern matching with the characteristic point stored at time t (Step S5). Here, a detailed explanation is provided of the processing by which the certainty CA of two characteristic points is calculated with reference to FIG. 3. To begin with, m pixels×n pixels (provided m and n are natural numbers of 2 or more) around a characteristic point are selected for an input image from which a characteristic point has been extracted. Next, m pixel×n pixels (provided m and n are natural numbers of 2 or more) around a characteristic point of the previous image are selected. At this time, although the selected magnitude (m×n) of the pixels surrounding the two characteristic points may be determined arbitrarily, the number of selected pixels of the two characteristic points must be the same.

As a result of this selection operation, the sets of m×n brightness values having brightness values of 256 gradations (integer of 0 to 255), namely $g1=\{g1_1, g1_2, \ldots, g1_{mn}\}$, $g2=\{g2_1, g2_2, \ldots, g2_{mn}\}$, is obtained. Among the resulting two sets of brightness values, subtraction is performed on the brightness values of each corresponding pixel, and certainty CA is calculated by adding the results of subtraction. Namely, certainty is calculated by $CA=|(g1_1-g2_1)|+|(g1_2-g2_2)|+ \ldots +|$ According to this operation, if two sets of brightness values are completely identical, then CA ought to be "0". Thus, the smaller the value of CA as calculated by this operation, the higher the possibility of two characteristic points being the same.

Next, position detection unit 6 compares certainty CA and threshold TC (Step S6). In the case CA is smaller than TC, displacement vector da is calculated from the coordinate value as the amount of characteristic point movement over a continuous period of time, and that vector da is then stored in position detection unit 6 (Step S7). On the other hand, in the case CA is smaller than TC, the process proceeds to Step S8.

Next, position detection unit 6 evaluates whether or not processing has been performed for all characteristic points of the previous image (Step S8). If all of the characteristic points have not been processed, the process returns to Step S4 and processing is repeated. On the other hand, if processing has been completed for all characteristic points of the previous image, position detection unit 6 evaluates whether or not processing has been performed for all characteristic points of the input image (Step S9). If all of the characteristic points have not been processed, the operation returns to Step S3 and processing is repeated. On the other hand, if processing has been completed for all characteristic points of the input image, the process proceeds to Step S10.

In this manner, a correlation is made between the characteristic points of an input image (time t+1) and characteristic points of the previous image (time t) by the processing of Steps S3 through S9, and the displacement vector da of the correlated characteristic points is calculated and stored. However, since displacement vector da is only calculated in the case the certainty of two characteristic points exceeds a prescribed threshold value Tc, the number of displacement vectors da varies each time processing is performed.

Here, although processing is performed on all characteristic points of the previous image, results may be determined by calculating only the vicinities of the characteristic points to be determined in coordination with the required amount of movement in order to reduce the calculation processing load.

Next, position detection unit 6 reads the stored displacement vectors da and calculates the mean displacement vector Td (Step S10).

Next, position detection unit 6 reads out the stored displacement vectors da one at a time (Step S11).

Position detection unit 6 then calculates |vector Td−vector da| and judges whether or not this value is smaller than a prescribed threshold value A (Step S12). According to this judgment, a judgment is made as to the extent of the difference between each of the calculated displacement vectors da and mean displacement vector Td.

As a result of this judgment, in the case the calculated difference (|vector Td−vector da|) is smaller than threshold value A, position detection unit 6 judges the characteristic point used when calculating the relevant displacement vector da to be a stationary object (Step S13). On the other hand, in the case the above calculated difference is greater than threshold value A, position detection unit 6 judges the characteristic point used when calculating the relevant displacement vector da to be a moving object (Step S14). This processing is performed for all calculated displacement vectors da (Step S15) and as a result, a judgment is made as to whether a characteristic point is a stationary object or moving object for each characteristic point.

Next, position detection unit 6 extracts those characteristic points judged to be stationary objects for which certainty CA is the superordinate (Step S16). Here, certainty CA being superordinate refers to certainty CA being superordinate the smaller the value of CA. Those characteristic points extracted by this extraction processing are characteristic points of a previous image (time t) that form a pair with characteristic points of the input image (time t+1), and these characteristic points serve as the reference characteristic points for calculation of self-position.

Next, position detection unit 6 determines characteristic point distance from the correlating points between each of the extracted reference characteristic points and the distance image stored in distance image storage unit 4, and calculates the amount the robot moved from the time at which the previous image was acquired to the time at which the current image (input image) was acquired based on the amount of movement of that characteristic point and the relative position of the robot (Step S17). When the processing of Step S17 is completed and the position of the robot is determined, the program returns again to Step S1 and repeats the same processing on a characteristic point for which a correlation was previously obtained that has been stored in memory.

Figure 4:
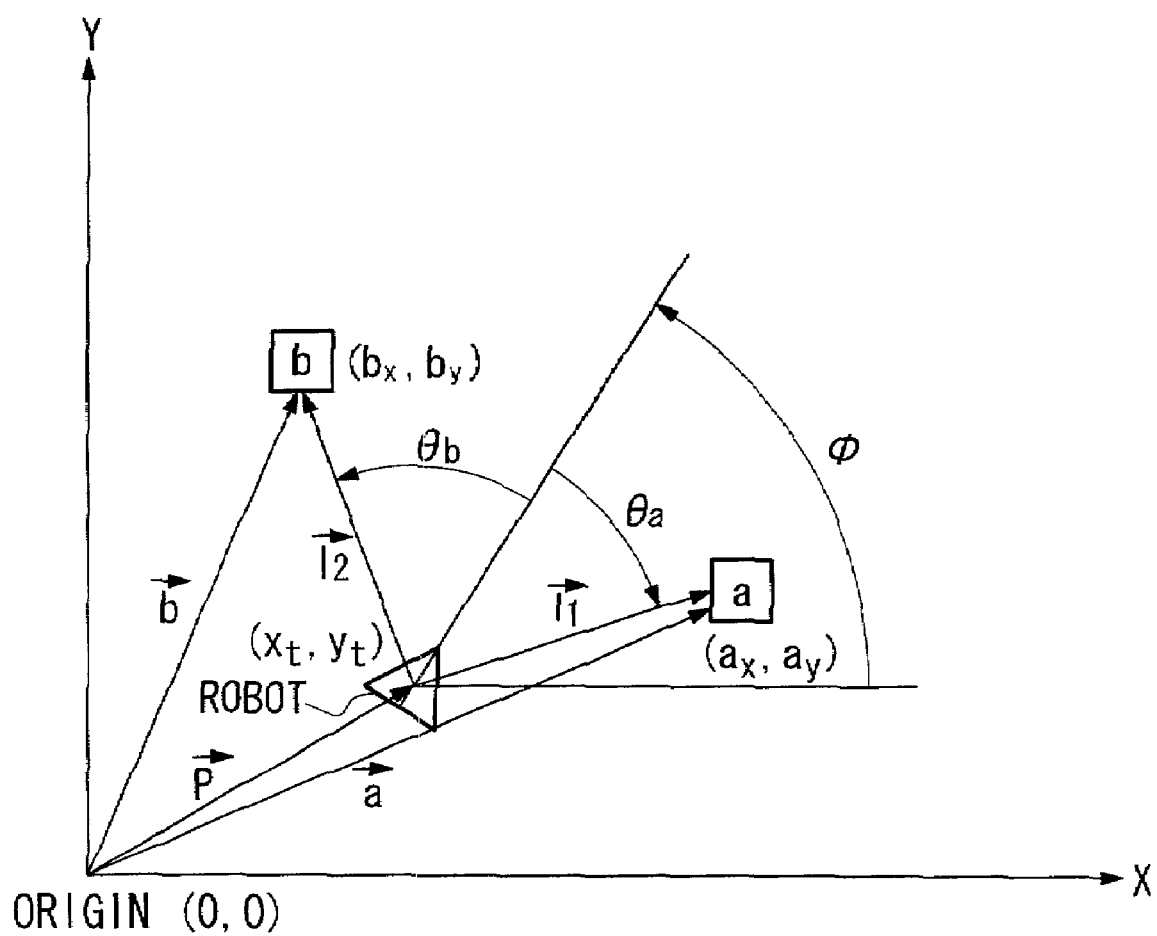
FIG. 4 is an explanatory drawing showing a coordinate system in the case of determining the position of a robot.

Here, an explanation is provided of the principle for calculating self-position with reference to FIG. 4. The coordinate system here is a coordinate system defined when the robot is in the initial state, and the forward direction of the robot is designated as the X axis, while the direction that intersects this X axis is designated as the Y axis. In FIG. 4, a and b respectively represent arbitrary characteristic points such as columns located in a building that are extracted by the above processing. Data obtained by acquiring images by the robot consists of the relative position of characteristic point a $(x_a, y_a)$ and the relative position of characteristic point b $(x_b, y_b)$ shown in FIG. 4. The symbol $\phi$ here represents the angle of rotation of the robot about the Z axis, and is positive during counter-clockwise rotation.

Here, if the absolute positions of a and b are known and hypothesized to be a $(a_x, a_y)$ and b $(b_x, b_y)$, then the absolute position $(x_t, y_t)$ of the robot is the intersection of circles having radii of $l_1 = \sqrt{(x_a^2 + y_a^2)}$ and $l_2 = \sqrt{(x_b^2 + y_b^2)}$ centered on points a and b using the relative coordinate values $(x_a, y_a)$ and $(x_b, y_b)$ of a and b. In the case of taking the vector extending from the origin (0,0) to the robot's position $(x_t, y_t)$ to be P→ (in the following explanation, the vector is expressed as "P→", and in the drawings, an arrow "→" is added after the letter P), the vectors extending from the origin to points and a and b to be a→ and b→, and the vectors extending from the robot's position $(x_t, y_t)$ to points a and b, respectively, to be $l_1$→ and $l_2$→, the relationships P→=(a→)−($l_1$→) and P→=(b→)−($l_2$→) are valid in the case robot angle of rotation $\phi$ is 0. In addition, in the case the robot angle of rotation $\phi$ is not 0, vectors become valid which are rotated by (−$\phi$) from vectors $l_1$→ and $l_2$→, respectively. In addition, the following equation is determined with respect to a in consideration of angle of rotation $\phi$ in the direction of the Z axis of the robot:

$$\tan^{-1}(a_y/a_x) - \tan_{-1}(y_a/x_a) = \phi$$

In addition, the following equation is determined with respect to b:

$$\tan^{-1}(b_y/b_x) - \tan^{-1}(y_b/x_b) = \phi$$

Robot angle of rotation $\phi$ and robot position $(x_t, y_t)$ can thus be determined according to the above. Although a and b were hypothesized to be known in the above explanation, since an unknown object is treated here, the absolute positions of a and b cannot be determined. Thus, the positions of a and b are determined based on the position of the robot at time t, and the displacement of robot position (amount of movement of the robot) is determined based on displacement da of the relative positions of a and b obtained at time t+1. By then adding this displacement to known absolute position coordinates, robot position at time t+1 can then be determined. Naturally, robot position can be easily determined based on the relative positions of a and b in the case a and b are known.

The calculated position is notified to movement control unit 7 after which robot movement is controlled by movement control unit 7 based on this position. In addition, in the case it is necessary to detect position, movement control unit 7 may be made to output position detection instructions to characteristic point extraction unit 5 so that characteristic point extraction unit 5 begins the processing shown in FIG. 2 upon receiving those position detection instructions. By configuring in this manner, if, for example, the position detection apparatus shown in FIG. 1 is installed in an automobile and position is made to be detected using images at the time the automobile enters a tunnel and so forth, position detection can be continued even in cases in which position detection by GPS can no longer be performed.

In this manner, by continuously tracking the same stationary object from continuously incorporated images, the displacement of the position of the stationary object can be determined over time, and the amount of self-movement can be determined each time from the amount of this displacement, thereby enabling self-position to be detected accurately. Although the explanation here has dealt with the example of performing tracking processing with two consecutive images, in order to improve reliability and precision, tracking may be performed by determining the history of movement of a characteristic point from two or more images and extracting stationary objects therefrom.

In this manner, in the case the position of a target characteristic point is known, the absolute position of the robot can be determined, and in the case it is unknown, robot position $(x_{t+1}, y_{t+1})$ can be determined by determining the target position from the target relative position and robot position $(x_t, y_t)$ at time t based on the amount of displacement of the position of that target at time t+1. In addition, in the case of having continuously tracked the same target for a continuous amount of time K, the position at time t+k can be similarly detected based on the amount of displacement of $(x_{t+k}, y_{t+k})$ during time k.

Furthermore, distance image formation unit 3 shown in FIG. 1 may be replaced with radar and so forth using ultrasonic waves or electromagnetic waves. At this time, the measuring field of view of the radar is set to be the same as that of cameras 1 shown in FIG. 1. In addition, in the case of obtaining distance images using radar and so forth, only a single camera 1 should be provided for obtaining brightness images.

In addition, in the case the moving body is moving, characteristic points may move outside the frame as the moving body approaches a characteristic point, thereby preventing detection of position. Consequently, characteristic points for which the amount of movement is calculated are successively switched by performing the processing shown in FIG. 2 on all of a plurality of characteristic points. In this case, however, since the error in measured distance increases as the characteristic point moves away from the moving body s compared with the case of approaching the moving body, if the amount of movement is made to be calculated by preferentially selecting the characteristic point within the frame that is at the shortest distance from the moving body, deterioration of movement accuracy can be prevented. In addition, tracking may also be performed such that the position of an object that has temporarily left the frame is stored in memory and then recognized as the same object when it again returns to inside the frame.

SECOND EMBODIMENT

Figure 5:
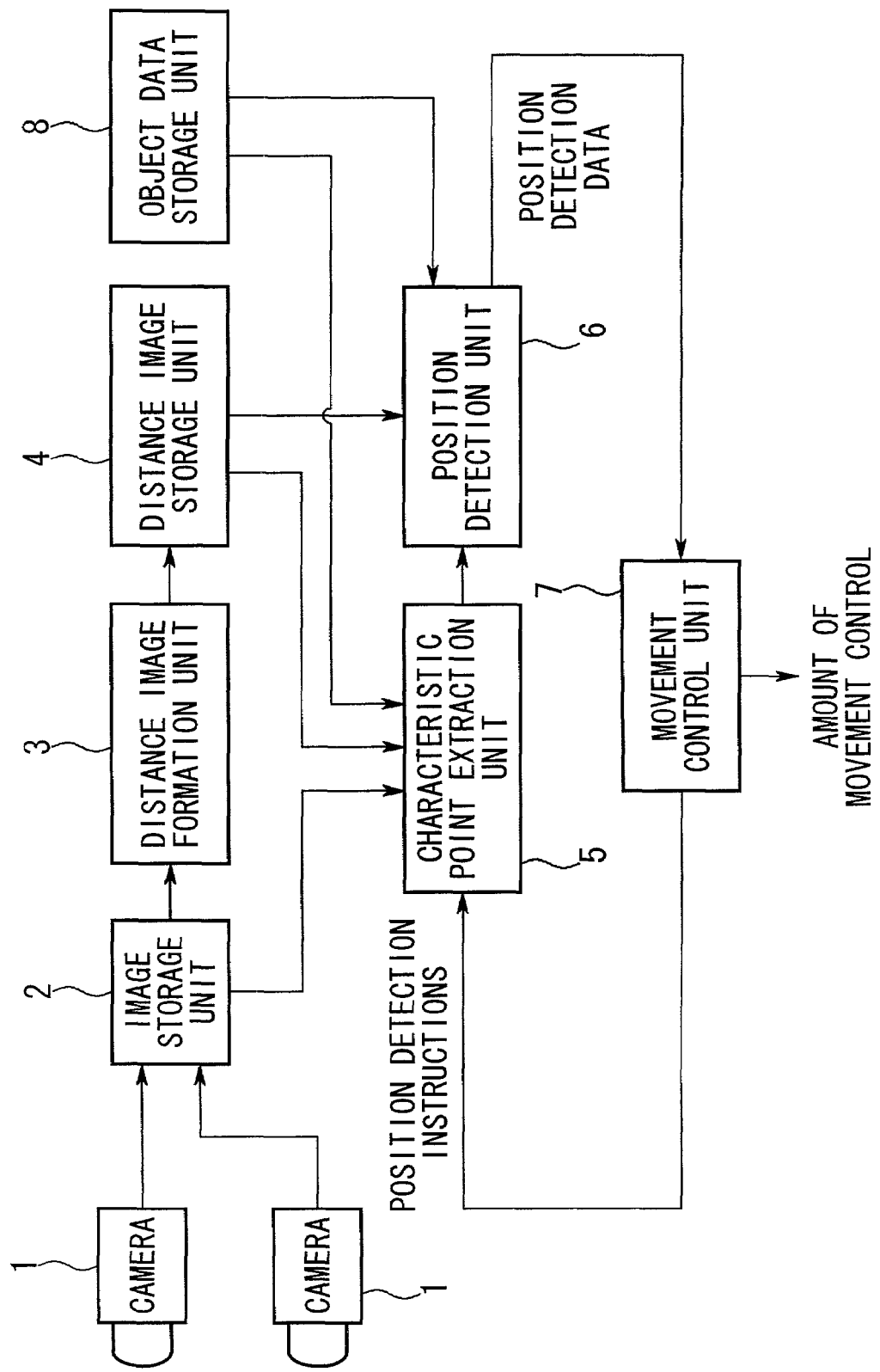
FIG. 5 is a block diagram showing the constitution of a second embodiment of the present invention.

Next, an explanation of a second embodiment for detection of self-position based on minimal map data without using a detailed map as in the prior art is provided with reference to FIGS. 5 through 9. FIG. 5 is a block diagram showing the constitution of another embodiment of the present invention. The block diagram shown in FIG. 5 is different from the block diagram shown in FIG. 1 with respect to newly providing object data storage unit 8. This object data storage unit 8 stores sets of characteristic points of a plurality of known stationary objects in the form of a characteristic amount, and a map of objects corresponding to the absolute positions of those stationary objects, and is referred to by characteristic point extraction unit 5 and position detection unit 6. Known stationary objects referred to here include such stationary objects as columns, plants, lockers and other articles of furniture in a room. In addition, although there are no particular restrictions on the positions of the objects that are stored, if positions that cause a change in behavior when a moving object moves, namely characteristic objects present in the vicinity of corners or in front of doors and so forth, are preferentially stored, the moving object can be controlled both efficiently and accurately.

Figure 6:
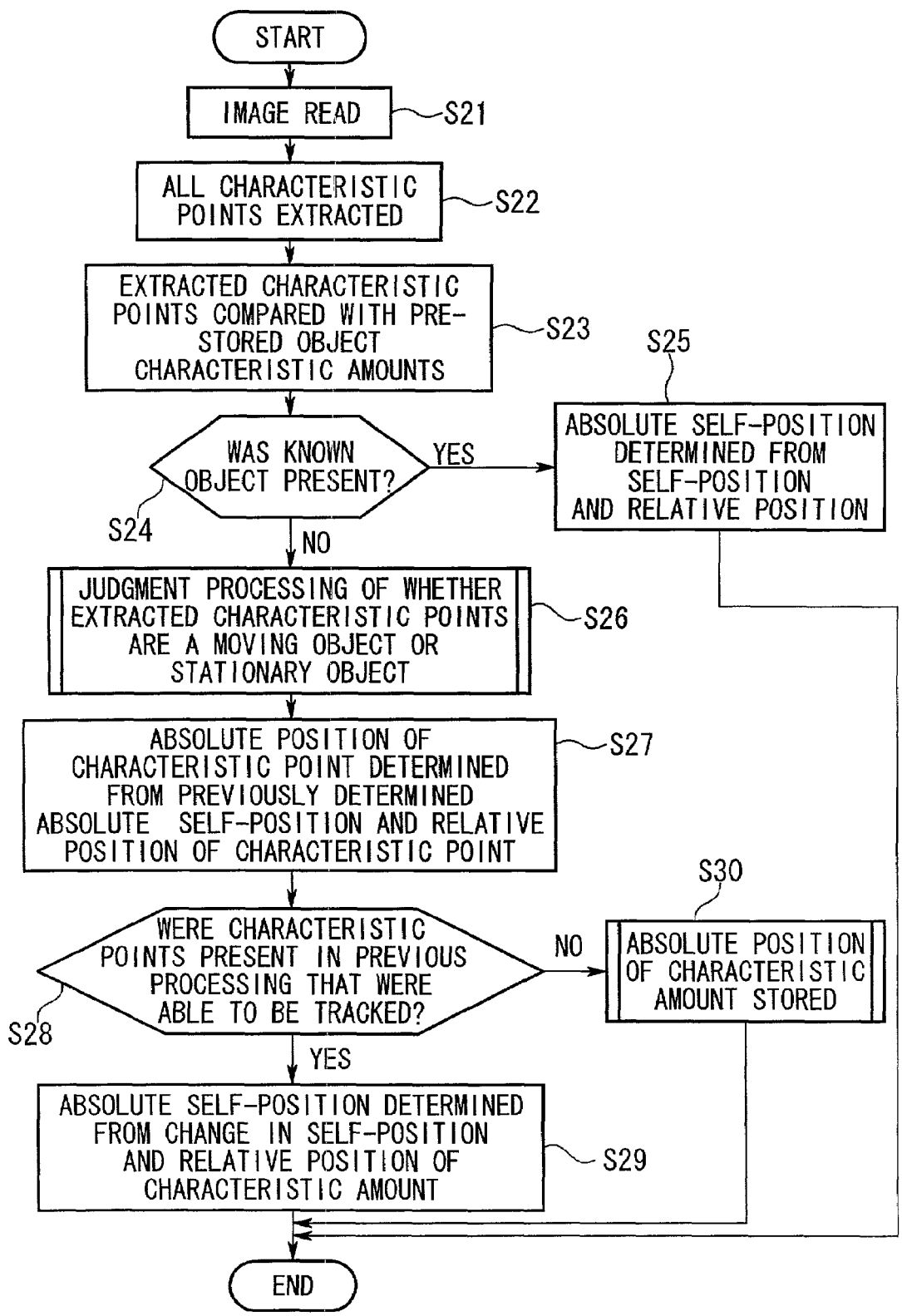
FIG. 6 is a flow chart showing the operations of characteristic point extraction unit 5 and position detection unit 6 shown in FIG. 5.

Next, an explanation is provided of the operation of the position detection apparatus shown in FIG. 5 with reference to FIG. 6. Here, since the operations of cameras 1, image storage unit 2, distance image formation unit 3 and distance image storage unit 4 are the same as those in the previously described embodiment, their explanations are omitted. Each of the processing shown in the flow chart of FIG. 6 is performed repeatedly each time an image is captured by cameras 1.

To begin with, characteristic point extraction unit 5 reads an image stored in image storage unit 2 (Step S21). Characteristic point extraction unit 5 then extracts characteristic points from the read brightness image and stores these characteristic points in characteristic point extraction unit 5 (Step S22).

The characteristic points referred to here are equivalent to an unchanging characteristic amount that is used in image processing that characterize forms appearing in an image. In addition, the characteristic amount refers to a plurality of groups of characteristic points that compose the object shape. Extraction of these characteristic points is performed by, for example, performing edge detection processing on an image and selecting a plurality of characteristic points that compose the detected edge. Furthermore, characteristic point extraction unit 5 may read distance images stored in distance image storage unit 4, and then extract characteristic points from these distance images. Characteristic points are stored in the form of sets of characteristic points extracted from an image at time t (previous image), and these characteristic points are stored using their coordinate values on the image.

Next, characteristic point extraction unit 5 reads those characteristic points stored inside one at a time and compares them with the plurality of object data characteristic point groups (characteristic amount) stored in object data storage unit 8 by pattern matching (Step S23). This comparison processing is performed by processing similar to the processing of the previously described embodiment (processing shown in FIG. 2). In addition, the object data referred to here indicates data comprised of the absolute coordinates of a position at which characteristic points and a stationary object are present after extracting the characteristic points of the stationary object from an image obtained in advance. Here, a simple template matching method may be used for the pattern matching device used.

Continuing, characteristic point extraction unit 5 makes a judgment as to whether or not object data that coincides with or has a high degree of certainty, namely has a high correlation, with the characteristic point obtained in Step S22 was present in object data storage unit 8, or in other words, whether or not a known object was present (Step S24). In the case a known object was present as a result of this judgment, position detection unit 6 determines absolute self-position from this known stationary object and relative self-position (Step S25). This absolute position is calculated from the absolute coordinates of the known object and the relationship between a known object obtained from a distance image stored in distance image storage unit 4 and relative self-position.

Next, in the case a known object was not present in Step S24, characteristic point extraction unit 5 makes a judgment as to whether the characteristic point extracted in Step S22 is a moving object or a stationary object (Step S26). In the case a stationary object is obtained as a result of this judgment, the respective absolute positions are determined from the relative positional relationship with self-position based on self-position data determined immediately before (Step S27). This judgment processing is performed according to the processing of Steps S4 through S13 and S14 shown in FIG. 2. A judgment is then made as to whether the stationary object obtained as a result of this judgment processing could also have been tracked in the previous processing (time t) (Step S28). This judgment is made by comparing the amount of consistency between the characteristic amount previously stored in object data storage unit 8 and the current characteristic amount by pattern matching. In addition, accuracy can be improved by comparing the absolute position of the characteristic amount previously stored in object data storage unit 8 in Step S30 with the position determined Step S27, and adding a judgment that tracking could have been performed in the case they are in close proximity. As a result of this judgment, in the case the characteristic point could have also been tracked in previous processing, position detection unit 6 determines absolute self-position from the relative positions of the stationary object and self-position (Step S29).

On the other hand, in the case a characteristic point is judged in Step S28 to be a new point that could not have been tracked, characteristic point extraction unit 5 determines the absolute position of the new characteristic point based on the characteristic point of a new stationary object and the absolute self-position at time t previously determined in Step S25 or Step S29, and then stores that absolute position in object data storage unit 8 (Step S30). Calculation of the amount of movement is performed according to the processing of Steps S3 through S17 shown in FIG. 2.

In the judgment of Step S28 described above, judgment of whether or not the positions are in close proximity is made by stipulating a distance threshold value and judging whether or not the previous position and current position are within this distance. However, in cases in which there is variation or noise in the resulting distance depending on the particular image, statistical processing may also be performed. This may be performed by assuming that a certain characteristic amount could have been tracked for a continuous amount of time, calculating each of the variance values for the variance in relative position (x,y) with respect to self-position obtained from distance images for a position on an image of that characteristic amount, and judging those within the range of variance to be identical objects and those outside the range of variance to be different objects at the time the variance values converge. Since variance values differ depending on the properties of the stereo cameras and the object, predefined variance values set in advance may be used, or predefined values may be used that have been set and stored for each object in object data storage unit 8. In addition, since the properties of stereo cameras are such that accuracy decreases at the square of the distance, a function may be used such that variance values are changed at the square of the distance.

Figure 7:
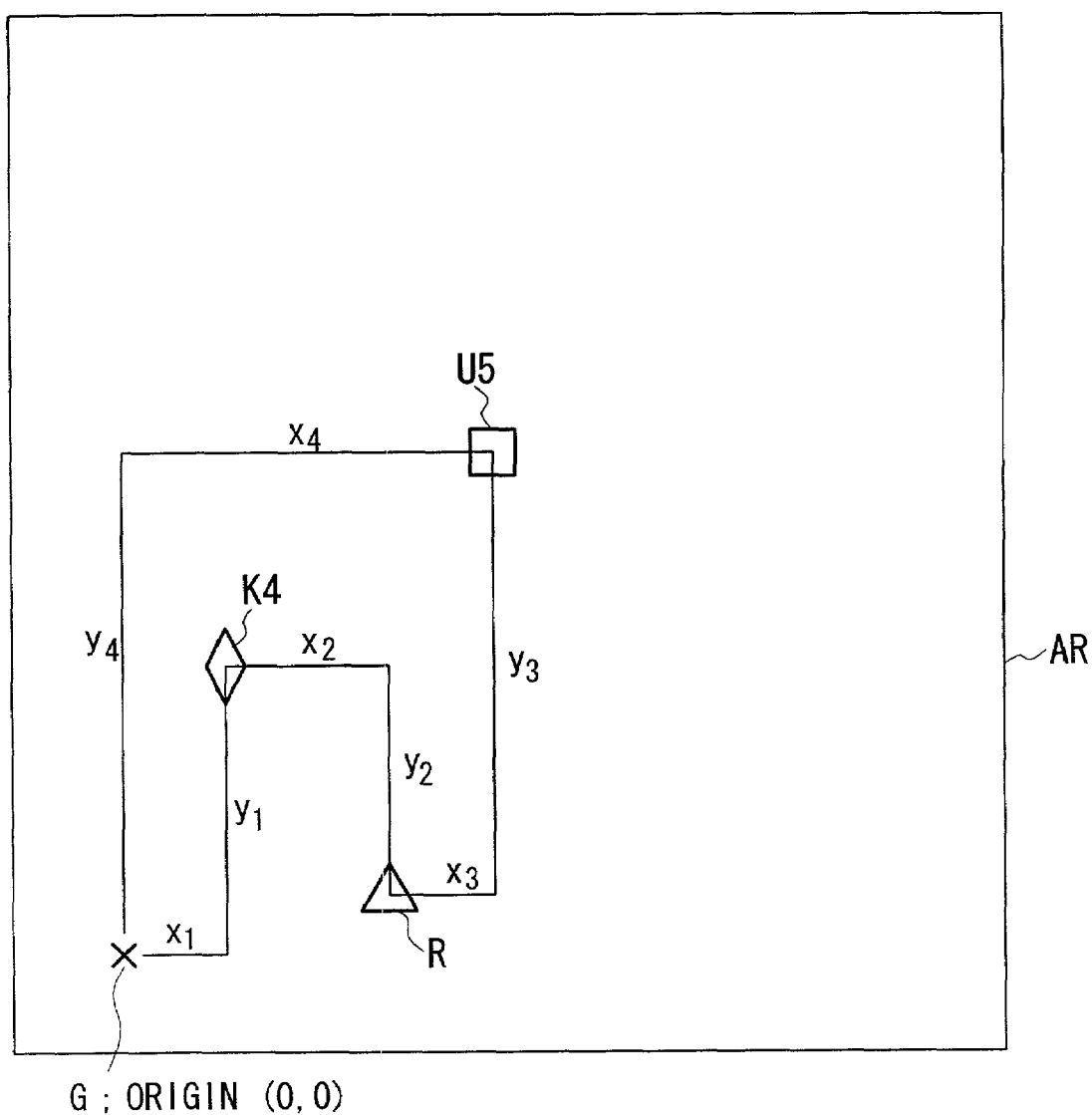
FIG. 7 is an explanatory drawing showing a method for calculating position.
Figure 8:
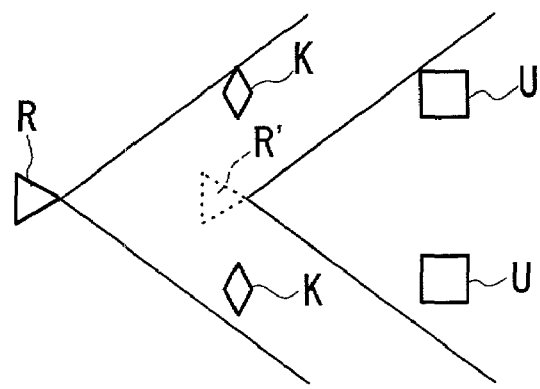
FIG. 8 is an explanatory drawing showing a method for calculating position.

Here, an explanation is provided of the method of calculating absolute position in Steps S25 and S29 with reference to FIG. 7. In FIG. 7, reference symbol AR indicates the action area, and origin G is determined in advance within this action area AR. Reference symbol R indicates a robot, reference symbol K4 a known stationary object, and reference symbol U5 an unknown object. The angle of rotation φ of robot R is ignored in FIG. 7 to simplify the explanation. When in this state, absolute self-position of robot R $(R_x, R_y)$ is determined according to $(R_x, R_y) = (x_1 + x_2, y_1 - y_2)$ based on the relative coordinate values $(x_t, y_t)$ of object K4 for which relative position is known, and the relative position for this known object K4 and robot R $(x_2, y_2)$. In addition, the coordinate values $(x_4, y_4)$ of the relative position of unknown object U5 are similarly determined by $(x_4, y_4) = (x_1 + x_2 + x_3, y_1 - y_2 + y_3)$. As shown in FIG. 8, in the case known stationary object K and unknown stationary object U are simultaneously captured by a camera, since the absolute coordinates of unknown object U are made to be determined by calculation, even in the case robot R has moved to the position of reference symbol R' preventing object K from being captured by the camera while only allowing unknown object U to be captured, the pre-calculated absolute coordinates can still be used.

Furthermore, in the case a plurality of characteristic amounts are extracted, the judgment of Step S28 is made for all characteristic amounts, and in Step S29, self-position is determined from the relative positions with all characteristic amounts, after which self-absolute position is determined from the average value.

In this manner, since absolute self-position is able to be determined according to the status of a known object, unknown object and an unknown object for which position has become known by calculation, movement control unit 7 is able to accurately control movement.

Figure 9:
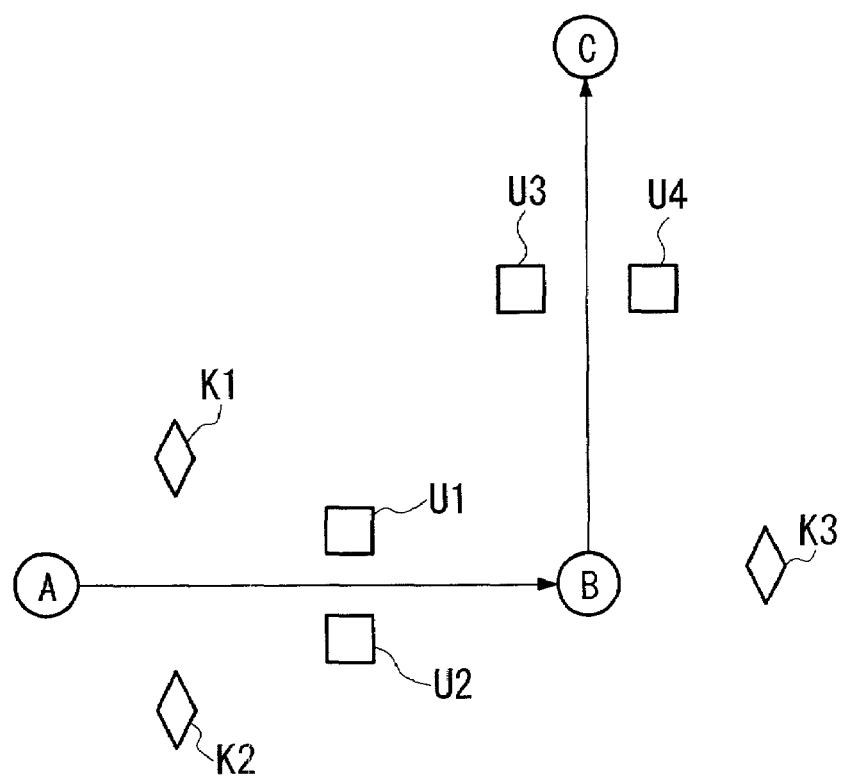
FIG. 9 is an explanatory drawing showing a method for calculating position.

Next, an explanation is provided of the operation using a specific example with reference to FIG. 9. The explanation here deals with the example of a robot moving from point A to point B and further moving to point C. To begin with, as a result of the comparison processing of Step S23, objects K1, K2 and K3, for which the absolute coordinates are known, are recognized to be present at point A. Position detection unit 6 then determines absolute self-position from the coordinate values of the absolute positions of objects K1 and K2 since the distance of object K3 among objects K1, K2 and K3 is the greatest (Step S25). At this time, position detection unit 6 determines the coordinate values of unknown objects U1 and U2 by calculation, and stores those values in internal memory (Step S30). The robot then moves while determining self-position based on the positions of unknown objects U1 and U2 for which the relative positions have become known (Step S29), and in the case of reaching a position at which unknown objects U1 and U2 cannot be captured by the cameras, moves to point B while determining self-position based on known object K3 (Step S25) and finally determines the absolute position of point B. As a result, position data and object data relating to unknown objects U1 and U2 are updated.

Next, the robot changes direction and heads in the direction of point C. At this time, unknown objects U3 and U4 are captured by cameras 1. In this case, however, since the orientation has changed by 90°, there may be cases in which known objects are not captured in images containing unknown objects U3 and U4. When this happens, self-position is determined by determining the amount of movement based on unknown objects U3 and U4, and adding the determined amount of movement to the relative coordinate values of point B (Step S29). In the case a known object is captured during the course of moving to point C, absolute self-position is determined based on that known object, and the error in relative position determined according to the amount of movement is reset.

In this manner, in the case of determining absolute self-position based on the position of an unknown object, although the error in relative position obtained from a distance image accumulates, in the case a known object is captured, since self-position can be determined from this known object, the cumulative error can be reset, thereby enabling accurate position detection.

Next, when again moving in the same area, in the case of moving to point A, since previously unknown objects U1 and U2 are now stored in internal memory as map position data and object data, they are used as known objects. In addition, this applies similarly to unknown objects U3 and U4. In addition, in the case a previously known object cannot be recognized to be present currently, since there is the possibility that the object is a moving object, processing may be added in which the possibility of that object being a moving object is stored in memory and removed from the detected objects.

However, since variations in distance data obtained from images may be large, there are cases in which it is difficult to determine the position of the robot by the method described above. Consequently, robot position may be calculated using a Kalman filter based on extracted reference characteristic points. By using this Kalman filter, robot position can be calculated while taking into consideration variations in distance data and so forth.

Here, an explanation is provided of the processing for calculating robot position in the case of using a Kalman filter. The Kalman filter used here is an extended Kalman filter, and its status equation is shown in Equation (1). Here, if the variables that express the status of the robot are represented with x, y, φ and T, and defined as:

$$\vec{P} = \begin{bmatrix} x_t \\ y_t \\ \phi_t \\ T_t \end{bmatrix}$$

then $x_t$ and $y_t$ are the x and y values on the x and y axes, $\phi_t$ is the angle of rotation about the z axis, and $T_t$ is the distance when moving from time step t to time step (t+1).

$$\begin{bmatrix} x_{t+1} \\ y_{t+1} \\ \phi_{t+1} \\ T_{t+1} \end{bmatrix} = \begin{bmatrix} x_t + \Delta T_t \cos\phi \\ y_t + \Delta T_t \sin\phi \\ \phi_t \\ 0 \end{bmatrix} + \begin{bmatrix} 0 \\ 0 \\ \Delta\phi_t \\ \Delta T_t \end{bmatrix} + \begin{bmatrix} 0 \\ 0 \\ v_\phi \\ v_T \end{bmatrix} \quad (1)$$

Figure 10:
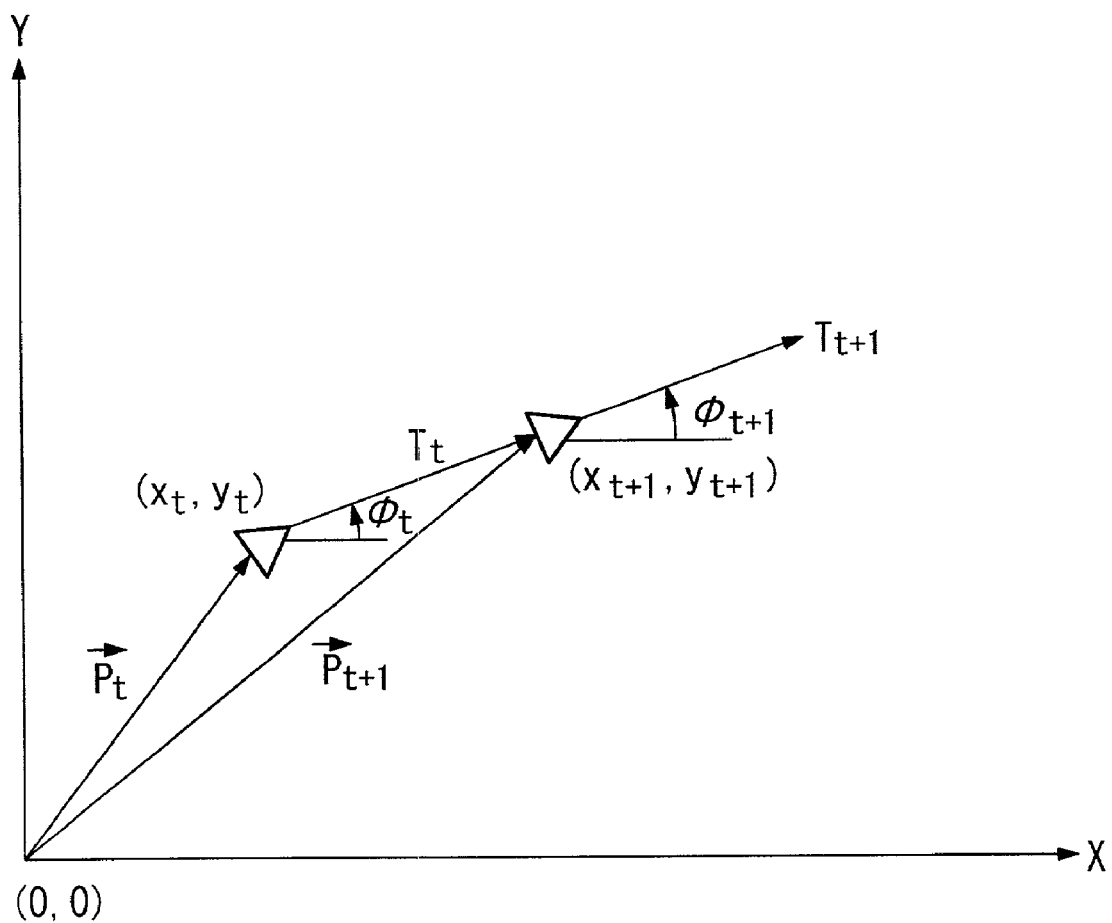
FIG. 10 is an explanatory drawing showing a status model of a Kalman filter.

In Equation (1), the second term from the right is the amount of change in distance control at time t from movement control unit 7, while the third term represents the system noise associated with robot control at time t. The coordinate system used here is the same as that of FIG. 4, while the meanings of each of the parameters that express the status of robot position are shown in FIG. 10.

In addition, Equation (2) is the observation equation of characteristic point a, while Equation (3) is the observation equation of characteristic point b. These equations indicate the relative measured values of characteristic points a and b as viewed from the robot. This measurement equation is produced geometrically based on the coordinate system shown in FIG. 4. The measured amount is expressed with three variables consisting of x, y and θ in the following manner:

$$\vec{l} = \begin{bmatrix} x \\ y \\ \theta \end{bmatrix}$$

in defined, then $$\vec{l}_1$$

becomes $$\begin{bmatrix} x_a \\ y_a \\ \theta_a \end{bmatrix} = \begin{bmatrix} (a_x - x_t)\cos(-\phi_t) - (a_y - y_t)\sin(-\phi_t) \\ (a_x - x_t)\sin(-\phi_t) + (a_y - y_t)\cos(-\phi_t) \\ \tan^{-1}\left(\frac{E_2}{E_1}\right) \end{bmatrix} + \begin{bmatrix} \omega_{ax} \\ \omega_{ay} \\ \omega_{a\theta} \end{bmatrix} \quad (2)$$

and $$\vec{l}_2$$

becomes $$\begin{bmatrix} x_b \\ y_b \\ \theta_b \end{bmatrix} = \begin{bmatrix} (b_x - x_t)\cos(-\phi_t) - (b_y - y_t)\sin(-\phi_t) \\ (b_x - x_t)\sin(-\phi_t) + (a_y - y_t)\cos(-\phi_t) \\ \tan^{-1}\left(\frac{E_4}{E_3}\right) \end{bmatrix} + \begin{bmatrix} \omega_{bx} \\ \omega_{by} \\ \omega_{b\theta} \end{bmatrix} \quad (3)$$

Furthermore, the following are also true:

$E_1 = (a_x - x_t)\cos(-\phi_t) - (a_y - y_t)\sin(-\phi_t),$ $E_2 = (a_x - x_t)\sin(-\phi_t) + (a_y - y_t)\cos(-\phi_t),$ $E_3 = (b_x - x_t)\cos(-\phi_t) - (b_y - y_t)\sin(-\phi_t),$ $E_4 = (b_x - x_t)\sin(-\phi_t) + (b_y - y_t)\cos(-\phi_t),$ Here, the second term on the right side in Equations (2) and (3) represents noise.

The above Equations (1) through (3) are used in the processing of Steps S25 and S29 shown in FIG. 6. By performing arithmetic operations on these equations each time an image is acquired, robot angle of rotation $\phi_{t+1}$ and robot position $(x_{t+1}, y_{t+1})$ can be determined. By using this extended Kalman filter, robot position can be detected more accurately since both system noise and measurement noise are taken into consideration as compared with calculating geometrically as described above. In addition, when using a Kalman filter, although not specifically stated in the judgment of Step S28, the covariance of observed values relative to characteristic points that converges within the Kalman filter can be used as the variance values of those characteristic points.

Furthermore, although the coordinates of the target object in the present embodiment are explained in planes x and y, self-position may also be determined to include height by expanding to the direction of height (z direction).

THIRD EMBODIMENT

Figure 11:
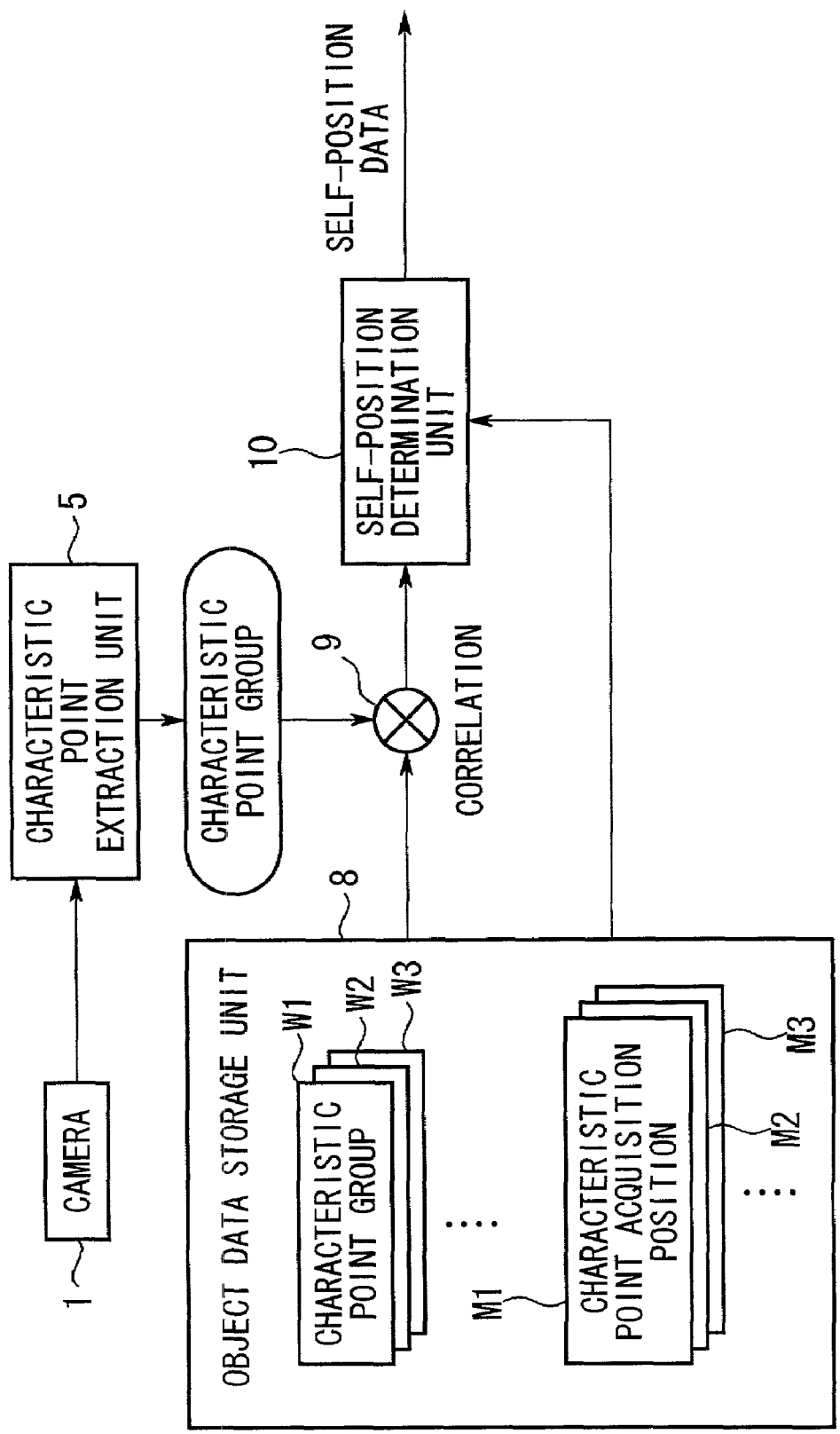
FIG. 11 is a block diagram showing the constitution of a third embodiment of the present invention.

Next, an explanation is provided of a third embodiment in which self-position is determined while referencing data obtained by pre-storing a plurality of characteristic point groups and position data of locations at which these characteristic point groups were obtained in the case of being unable to individually determine relative position with respect to a characteristic object due to factors such as occlusion in an environment in which a robot moves. FIG. 11 is a block diagram indicating the constitution of a position detection apparatus in a third embodiment. In this diagram, reference symbol 1 indicates a camera, and reference symbol 5 indicates a characteristic point extraction unit. Reference symbol 8 indicates an object data storage unit. Reference symbol 9 indicates a correlation processing unit that determines the correlation between two characteristic points. Reference symbol 10 indicates a self-position determination unit that determines self-position based on the processing results of correlation processing unit 9. In FIG. 11, image storage unit 2, which stores obtained images, and movement control unit 7 are omitted. In addition, since a distance image is not required in this third embodiment, related constituents are deleted.

Figure 13:
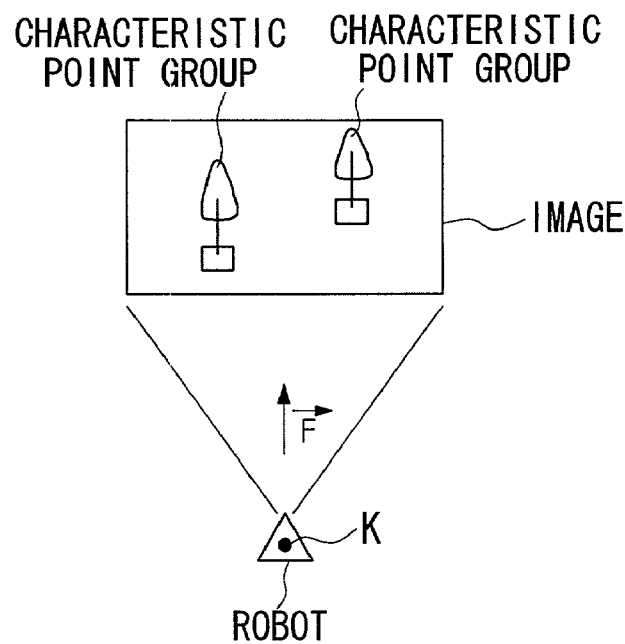
FIG. 13 is an explanatory drawing that explains the principle of position detection in the third embodiment.
Figure 14:
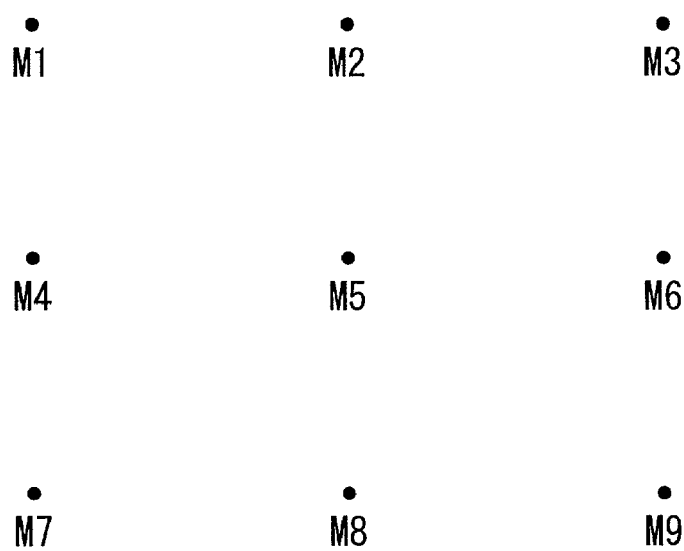
FIG. 14 is an explanatory drawing that explains the principle of position detection in the third embodiment.

To begin with, a brief explanation is provided of the principle for determining self-position with reference to FIGS. 13 and 14. FIG. 13 depicts a scene in the forward direction F→ of the robot at position M being captured with the camera followed by selection of characteristic point groups from the resulting image. At this time, if the selected characteristic point groups are represented with W, characteristic point groups W are correlated with position M and stored in object data storage unit 8. Since the characteristic point groups here do not allow identification of their respective relative positions due to occlusion and so forth, stored positions are correlated for all characteristic points.

FIG. 14 indicates the example of there being 9 positions at which characteristic point groups are stored in memory (M1 through M9), these positions being preset at positions over which the robot is likely to pass. If characteristic point groups extracted from an image captured with a camera facing in the direction of forward direction F→ of the robot from each preset position M1 through M9 are designated as W1 through W9, each position (referred to as a characteristic point acquisition position) M1 through M9 and characteristic point groups W1 through W9 are correlated into respective pairs which are then stored in advance in object data storage unit 8. When the robot is passing over an unknown position, the correlation between the characteristic point groups extracted from the image captured with the camera facing in the direction of forward direction F→ and pre-stored characteristic point groups W1 through W9 is determined, and characteristic point group Wn (where n is any of 1 through 9) having the highest correlation is judged to be the position over which the robot is passing, and the characteristic point acquisition position Mn (where n is any of 1 through 9) that forms a pair with this characteristic point group Wn becomes the self-position. For example, when characteristic point group W4 and a characteristic point group extracted from an image captured with the camera 1 exhibit the closest correlation, position M4 at which this characteristic point group W4 was acquired is determined to be the self-position.

Figure 12:
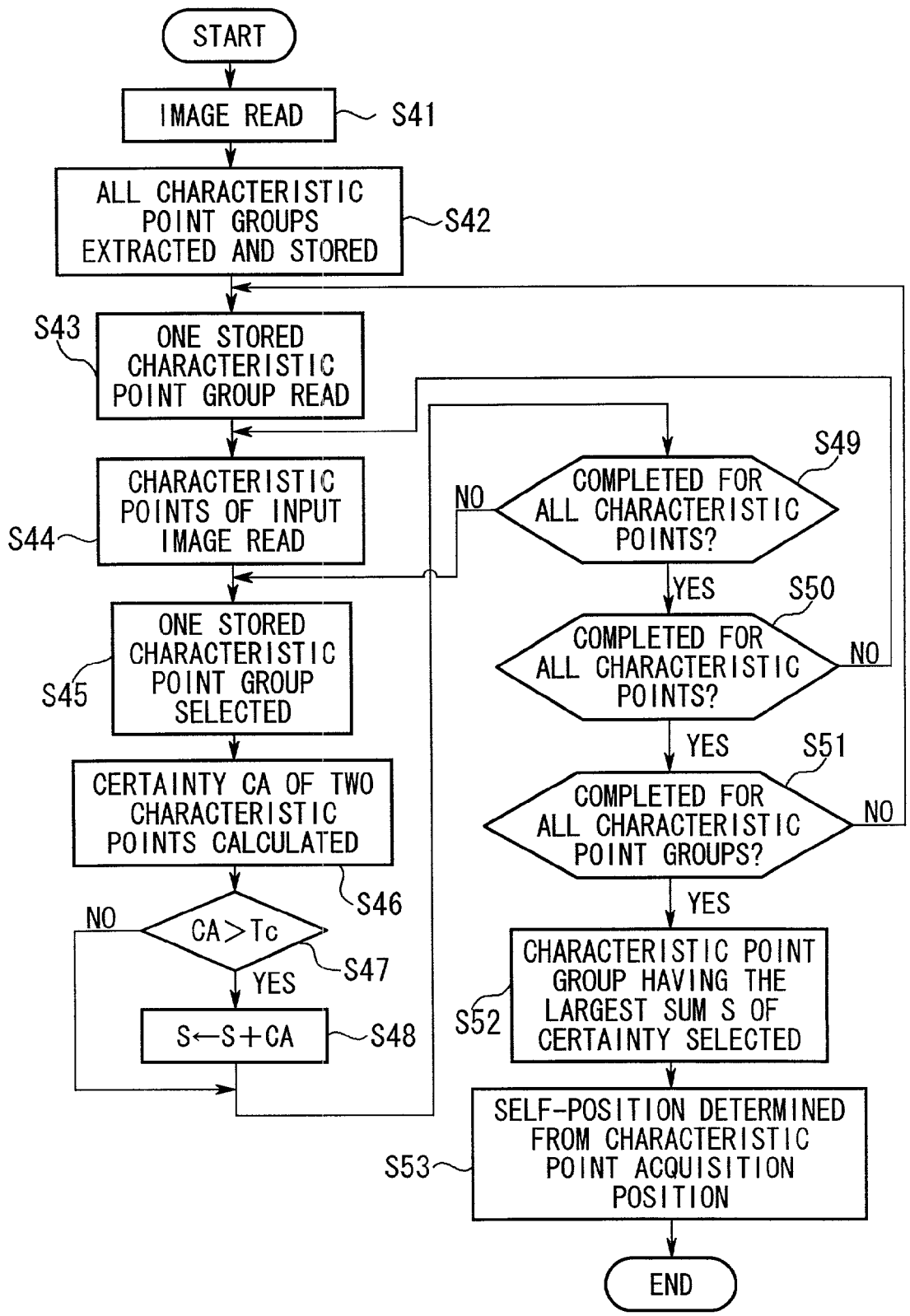
FIG. 12 is a flow chart showing the operation of the position detection apparatus shown in FIG. 11.

Next, an explanation is provided of the specific procedure for determining self-position by the position detection apparatus shown in FIG. 11 with reference to FIG. 12.

To begin with, characteristic point extraction unit 5 reads an image captured with camera 1 (Step S41). Characteristic point extraction unit 5 then extracts all characteristic point groups from the read image and stores them in internal memory (Step S42). On the other hand, correlation processing unit 9 reads one characteristic point group stored in object data storage unit 8 (Step S43). Continuing, correlation processing unit 9 reads one characteristic point of the input image (image captured with camera 1) from characteristic point extraction unit 5 (Step S44). Moreover, correlation processing unit 9 selects one characteristic point from the characteristic point group read in Step S43 (Step S45).

Next, correlation processing unit 9 calculates the certainty CA between the characteristic point read in Step S44 and the characteristic point selected in Step S45 (Step S46), and compares this with a predetermined threshold value Tc (Step S47). As a result, the program proceeds to Step S49 unless CA>Tc. On the other hand, if CA>Tc, the sum S of CA determined for each processing loop is determined (Step S48). Since the sum S of CA is determined for each characteristic point group, however, sum S of certainty CA is obtained for the number of characteristic point groups only. Correlation processing unit 9 then repeats the processing of Steps S45 through S48 for all characteristic points that compose the characteristic point group read in Step S43 (Step S49).

Next, correlation processing unit 9 repeats the processing of Steps S44 through S48 for all characteristic points that compose the characteristic point groups stored in Step S42 (Step S50), and then repeats the processing of Steps S43 through S48 for all the characteristic point groups stored in Step S42 (Step S51). The processing of Steps S42 through S48 consists of determining the certainty for all of the characteristic points that compose the characteristic point groups extracted from the input image as well as all of the characteristic points stored in object data storage unit 8. Furthermore, in the processing of Steps S44 through S50, the processing load can be reduced by determine certainty after selecting those characteristic points in close proximity to the image pixels.

Next, self-position determination unit 10 selects the characteristic point group for which the sum S of certainty CA determined in Step 48 is largest (Step 552). Self-position is then determined by reading the characteristic point acquisition position that forms a pair with the selected characteristic point group from object data storage unit 8 (Step 553) followed by output of that position as self-position data.

Figure 15:
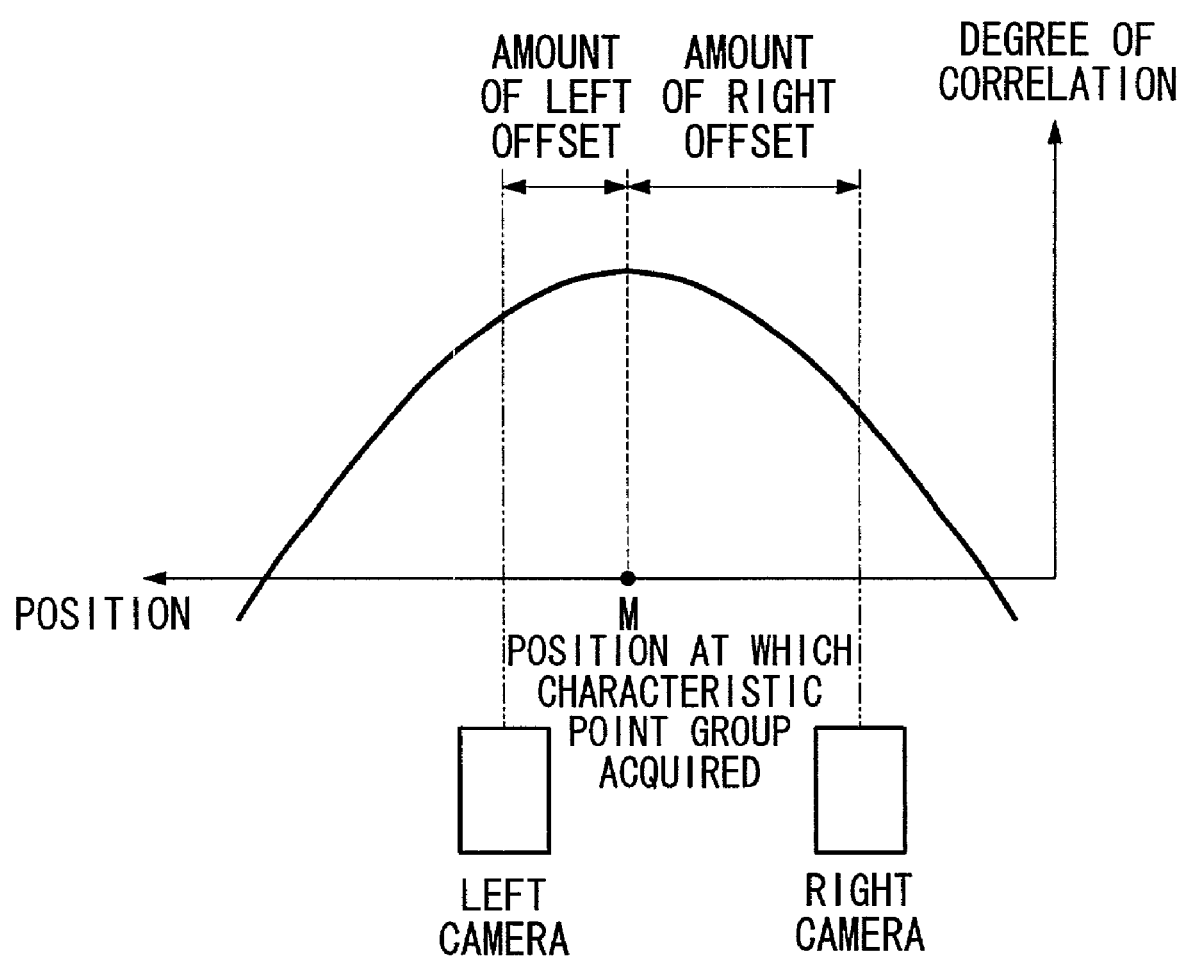
FIG. 15 is an explanatory drawing that explains the principle of position detection in the third embodiment.

In addition, as shown in FIG. 15, two left and right cameras that compose a stereo camera of the robot may be used to compare a pre-stored characteristic point group W for each camera and arithmetically determine correlation. When this is done, self-position can be determined according to the difference in the magnitudes of the degree of correlation of the camera images relative to the same characteristic point group W. Namely, the direction of offset to the left and right of position M can be detected from the difference in correlation values detected with each camera relative to position M corresponding to characteristic point group W. Consequently, since the number in the left and right directions of position M at which the characteristic point group is obtained can be reduced, the bother associated with capturing an image in advance can be reduced considerably. In addition, in the case there are two or more cameras that compose a stereo camera, they should be used by selecting cameras arranged in the left and right directions.

In this manner, since characteristic point groups within the movable range of a robot and positions at which those characteristic point groups were acquired are pre-stored in the robot, a characteristic point group having a high correlation with characteristic point groups extracted from an image obtained when the robot takes an action is selected from the characteristic point groups stored in memory, and the position at which that selected characteristic point group was acquired is taken to be self-position, so that self-position can be detected easily in cases such as when a robot acts within a predetermined room.

Although the above FIGS. 13 and 14 were explained assuming a single direction for the direction of image capturing at each position M1 through M9, if images in a plurality of directions are captured at each position, characteristic point groups are extracted for all resulting images, and those characteristic point groups are stored in object data storage unit 8, self-position can be detected by the same processing even if the forward direction of the robot differs at each position. In addition, the robot may also be made to extract characteristic point groups from enlarged or reduced images by using a zoom function of the camera equipped on the robot itself. If this is done, it becomes easier to obtain a correlation in a case such as when the robot is positioned between positions M2 and M5 shown in FIG. 14. Moreover, the robot may also be made to extract characteristic point groups from images obtained in a state in which a head unit equipped with a camera swings horizontally and vertically. When this is done, it becomes easy to obtain a correlation between characteristic points even in cases in which the robot is acting in a direction different from the forward direction when it acquired a stored characteristic point group.

In addition, the position detection processing previously described in the three embodiments may be suitably combined corresponding to the environment in which the robot moves, and self-position may be detected by selecting the necessary processing.

In addition, a program for realizing the processing shown in FIGS. 2, 6 and 12 may be recorded on a recording medium that can be read by a computer, the program recorded on the recording medium may be loaded into a computer system, and that program may then be run to perform position detection processing. Furthermore, the "computer system" referred to here includes an OS, peripherals and other hardware. In addition, in the case of utilizing a WWW system, the "computer system" also includes a web site providing environment (or display environment). In addition, a "recording medium that can be read by a computer" refers to a flexible disc, magneto-optical disc, ROM, CD-ROM or other portable media as well as a storage device such as a hard disk built into the computer system. Moreover, the "recording medium that can be read by a computer" also includes that which retains a program for a fixed amount of time in the manner of non-volatile memory (RAM) inside a computer system comprised of a server and clients in the case the program is transmitted via the Internet or other network or via a telephone line or other communication line.

In addition, the above program may be transferred to another computer system via a transfer medium or by a transfer wave within a transfer medium from a computer system that contains the program in a storage device and so forth. Here, the "transfer medium" that transfers the program refers to a medium having a function for transferring information in the manner of the Internet or other network or a telephone line or other communication line. In addition, the above program may also be that for realizing a portion of the functions described above. Moreover, it may also be that which realizes the above functions by combining with a program already stored in a computer system in the form of a so-called differential file (differential program).

As has been explained above, according to the present invention, since the same stationary object is extracted from the images of two consecutive frames, the displacement of the stationary object is determined and the amount of self-movement is determined from the amount of this displacement, whereby the present invention offers the advantage of being able to accurately detect self-position. In addition, since extraction of the stationary object can be performed independently, the constitution can be simplified since it is not necessary to provide a map and so forth in which the positions of stationary objects have been defined in advance. Moreover, since it is not necessary to provide a map such as road map data, in addition to it being possible to simplify the constitution, since the advantage is offered in which it becomes possible to move to an unknown location and eliminate restrictions on the range of action of a moving object, the present invention is particularly suited to a humanoid robot that moves by the use of legs.

In addition, according to the present invention, since a position detection device is provided that detects self-position by substituting self-movement control and the observed amount of the above reference point into an extended Kalman filter, the present invention offers the advantage of being able to detect self-position more accurately.

In addition, according to the present invention, since pre-stored object data and extracted characteristic points are compared and characteristic points having a high degree of correlation are treated as known characteristic points and used as reference characteristic points for calculating self-position, the present invention offers the advantage of being able to detect self-position more accurately.

In addition, according to the present invention, since object data is updated by determining the correlation between unknown characteristic points and known characteristic points in an image in which characteristic points treated as being known are present, and said unknown characteristic points are then used as known characteristic points and stored in memory, the present invention offers the advantage of enabling updating of map data and object data to be performed automatically.

Although there have been described what are the present embodiments of the invention, it will be understood that changes and modifications may be made thereto without departing from the gist, spirit or essence of the invention. The scope of the invention is indicated by the appended claims.

The invention claimed is:

1. A position detection apparatus for detecting a position of a moving robot, said position detection apparatus comprising:
   a local image acquisition device for acquiring an image of a forward field of view of said moving robot;
   a distance image acquisition device, having the same field of view as said local image acquisition device, said distance image acquisition device operable to acquire a distance image simultaneous to acquisition of an image by said local image acquisition device;
   a characteristic point extraction device that extracts respective characteristic points from the images by a specific method, wherein the characteristic points are created using two consecutively incorporated images, and
   a reference characteristic point selection device that selects a reference characteristic point for calculating the position of the moving robot, based on the characteristic points and the distance image.

2. A position detection apparatus according to claim 1, wherein the characteristic point extraction device extracts respective characteristic points from the images of at least two consecutive frames, and
   wherein the reference characteristic point selection device calculates the amount of displacement of a position between two frames of a characteristic point extracted by said characteristic point extraction device based on said distance image, and selects a reference characteristic point for calculating position according to said amount of displacement.

3. A position detection apparatus according to claim 1, wherein
   the characteristic point extraction device includes a position detection device that detects position by substituting self-movement control and the observed amount of said reference point into an extended Kalman filter, and
   the reference characteristic point selection device includes a reference point determination device that determines a reference characteristic point to serve as a reference during movement of said moving robot based on an image obtained from said local image acquisition device.

4. A position detection apparatus according to claim 1, wherein the reference characteristic point selection device compares pre-stored object information with extracted characteristic points, and considers those characteristic points having a high correlation to be known characteristic points that are used as reference characteristic points for calculating position.

5. The position detection apparatus according to claim 4, wherein said reference characteristic point selection device updates said object information by determining the relative relationship between unknown characteristic points and known characteristic points in an image in which characteristic points considered to be known are present, and storing said unknown characteristic points as known characteristic points.

6. The position detection apparatus according to claim 1, wherein said characteristic point extraction device comprises:
   a characteristic point group extraction device that extracts a characteristic point group in said image, and
   a position detection device that calculates position by correlating and storing multiple characteristic point groups in an image pre-obtained with said image acquisition device with positions at which said characteristic point groups are obtained, and calculating the correlation between a characteristic point group of a newly obtained image and pre-stored characteristic point groups.

7. A position detection method for detecting a position of a moving robot, said position detection method comprising:
   a local image acquisition step of acquiring an image of a forward field of view of said moving robot;

a distance image acquisition step that, in the same field of view as said local image acquisition step, acquires a distance image simultaneous to acquisition of an image by said local image acquisition step;

a characteristic point extraction step that extracts respective characteristic points from the images by a specific method, wherein the characteristic points are created using two consecutively incorporated brightness images, and a reference characteristic point selection step that selects a reference characteristic point for calculating the position of the moving robot, based on the characteristic points and the distance image.

8. The position detection method according to claim 7, wherein the characteristic point extraction step extracts respective characteristic points from the images of at least two consecutive frames, and wherein the reference characteristic point selection step calculates the amount of displacement of a position between two frames of a characteristic point extracted by said characteristic point extraction step based on said distance image, and selects a reference characteristic point for calculating position according to said amount of displacement.

9. The position detection method according to claim 7, wherein the characteristic point extraction step comprises a position detection step that detects position by substituting self-movement control and the observed amount of said reference point into an extended Kalman filter, and the reference characteristic point selection step comprises a reference point determination step that determines a reference characteristic point to serve as a reference during movement of said moving robot based on an image obtained from said local image acquisition step.

10. The position detection method according to claim 7, wherein the reference characteristic point selection step compares pre-stored object information with extracted characteristic points, and considers those characteristic points having a high correlation to be known characteristic points that are used as reference characteristic points for calculating position.

11. The position detection method according to claim 10, wherein said reference characteristic point selection step updates said object information by determining the relative relationship between unknown characteristic points and known characteristic points in an image in which characteristic points considered to be known are present, and storing said unknown characteristic points as known characteristic points.

12. The position detection method according to claim 7, wherein said characteristic point extraction step comprises:

a characteristic point group extraction step that extracts a characteristic point group in said image, and a position detection step that calculates position by correlating and storing multiple characteristic point groups in an image pre-obtained with said image acquisition step with positions at which said characteristic point groups are obtained, and calculating the correlation between a characteristic point group of a newly obtained image and pre-stored characteristic point groups.

13. A position detection program for detecting position of a moving robot, said position detection program comprising performing by computer:

a local image acquisition processing of acquiring an image of a forward field of view of said robot;

a distance image acquisition processing that, in the same field of view as said local image acquisition processing, acquires a distance image simultaneous to acquisition of an image by said local image acquisition processing;

a characteristic point extraction processing that extracts respective characteristic points from the images by a specific program, wherein the characteristic points are created using two consecutively incorporated brightness images, and a reference characteristic point selection processing that selects a reference characteristic point for calculating the position of the moving robot, based on the characteristic points and the distance image.

14. The position detection program according to claim 13, wherein the characteristic point extraction processing extracts respective characteristic points from images of at least two consecutive frames, and wherein the reference characteristic point selection processing calculates the amount of displacement of a position between two frames of a characteristic point extracted by said characteristic point extraction processing based on said distance image, and selects a reference characteristic point for calculating position according to said amount of displacement.

15. The position detection program according to claim 13, wherein the characteristic point extraction processing comprises a position detection processing that detects position by substituting self-movement control and the observed amount of said reference point into an extended Kalman filter, and the reference characteristic point selection processing comprises a reference point determination processing that determines a reference characteristic point to serve as a reference during movement of said moving robot based on an image obtained from said local image acquisition processing.

16. The position detection program according to claim 13, wherein the reference characteristic point selection processing updates said object information by determining the relative relationship between unknown characteristic points and known characteristic points in an image in which characteristic points considered to be known are present, and storing said unknown characteristic points as known characteristic points.

17. The position detection program according to claim 16, wherein said reference characteristic point selection processing updates said object information by determining the relative relationship between unknown characteristic points and known characteristic points in an image in which characteristic points considered to be known are present, and storing said unknown characteristic points as known characteristic points.

18. The position detection program according to claim 13, wherein said characteristic point extraction processing comprises:

a characteristic point group extraction processing that extracts a characteristic point group in said image, and a position detection processing that calculates position by correlating and storing multiple characteristic point groups in an image pre-obtained with said image acquisition processing with positions at which said characteristic point groups are obtained, and calculating the correlation between a characteristic point group of a newly obtained image and pre-stored characteristic point groups.

19. The position detection apparatus of claim 1, wherein said position detection apparatus further comprises two cameras, and wherein the image acquired by the local image acquisition device comprises a brightness image in which pixels in the image acquired by the local image acquisition device represent relative brightness, and the distance image acquired by the distance imaging device is formed by determining corresponding points of the pixels of each image from two brightness images obtained with the cameras such that pixels in the distance image represent a distance from the cameras.

20. The position detection method according to claim 7, wherein said position detection apparatus further comprises two cameras, and wherein the image acquired by the local image acquisition device comprises a brightness image in which pixels in the image acquired by the local image acquisition device represent relative brightness, and the distance image acquired by the distance imaging device is formed by determining corresponding points of the pixels of each image from two brightness images obtained with the cameras such that pixels in the distance image represent a distance from the cameras.

21. The position detection program according to claim 13, wherein said position detection apparatus further comprises two cameras, and wherein the image acquired by the local image acquisition device comprises a brightness image in which pixels in the image acquired by the local image acquisition device represent relative brightness, and the distance image acquired by the distance imaging device is formed by determining corresponding points of the pixels of each image from two brightness images obtained with the cameras such that pixels in the distance image represent a distance from the cameras.

22. A position detection apparatus for detecting a position of a moving robot, said position detection apparatus comprising:

a local image acquisition device for acquiring an image of a forward field of view of said moving robot;

a distance image acquisition device, having the same field of view as said local image acquisition device, said distance image acquisition device operable to acquire a distance image simultaneous to acquisition of an image by said local image acquistion device;

a characteristic point extraction device that extracts respective characteristic points from the images by a specific method, wherein the characteristic point extraction device extracts respective characteristic points from the images of at least two consecutive frames, and a reference characteristic point selection device that selects a reference characteristic point for calculating the position of the moving robot, based on the characteristic points and the distance image, wherein the reference characteristic point selection device calculates the amount of displacement of a position between two frames of a characteristic point extracted by said characteristic point extraction device based on said distance image, and selects a reference characteristic point for calculating position according to said amount of displacement.

* * * * *